United States Patent
Eid et al.

(10) Patent No.: US 12,497,287 B2
(45) Date of Patent: Dec. 16, 2025

(54) SELF-ASSEMBLED HIERARCHICAL POROUS Pd@PdPt YOLK-SHELL NANOARCHITICTONICS AND HOLLOW PDPT NANOCAGES HYDROGEN SENSORS

(71) Applicant: QATAR UNIVERSITY, Doha (QA)

(72) Inventors: Kamel Abdelmoniem Mohamed Eid, Doha (QA); Belal Salah Mohammed Hussien, Doha (QA); Aboubakr Moustafa Abdullah, Doha (QA); Ahmad Ibrahim Abdelrahman Ayesh, Doha (QA)

(73) Assignee: QATAR UNIVERSITY, Doha (QA)

( * ) Notice: Subject to any disclaimer, the term of this patent is extended or adjusted under 35 U.S.C. 154(b) by 389 days.

(21) Appl. No.: 18/204,513

(22) Filed: Jun. 1, 2023

(65) Prior Publication Data
US 2023/0391612 A1    Dec. 7, 2023

Related U.S. Application Data

(60) Provisional application No. 63/348,394, filed on Jun. 2, 2022.

(51) Int. Cl.
*B81B 7/02*   (2006.01)
*B82Y 40/00*   (2011.01)

(52) U.S. Cl.
CPC ............... *B81B 7/02* (2013.01); *B82Y 40/00* (2013.01); *B81B 2201/02* (2013.01)

(58) Field of Classification Search
CPC ....... B81B 7/02; B81B 2201/02; B82Y 40/00; B82Y 30/00; G01N 33/005

USPC .......................................................... 257/415
See application file for complete search history.

(56) References Cited

U.S. PATENT DOCUMENTS

| | | | |
|---|---|---|---|
| 9,469,886 B2 | 10/2016 | Yvon et al. | |
| 2006/0213251 A1 | 9/2006 | Rinzler et al. | |
| 2013/0077653 A1 | 3/2013 | Koshimizu et al. | |
| 2018/0214943 A1* | 8/2018 | Xia | B22F 9/24 |

FOREIGN PATENT DOCUMENTS

| | | |
|---|---|---|
| CN | 106770545 A | 5/2017 |
| WO | 2016/098942 A1 | 6/2016 |

OTHER PUBLICATIONS

Han Song et al, "Optical fiber hydrogen sensor based on an annealing-stimulated Pd—Y thin film", Sensors and Actuators B 216 (2015) 11-16, www.elsevier.com/locate/snb, http://dx.doi.org/10.1016/j.snb.2015.03.090, 6 pages.

P.A. Szilagyi et al., "Metal-organic framework thin films for protective coating of Pd-based optical hydrogen sensors", Journal of Materials Chemistry C 2013, 1, 8146, RSC Publishing, www.rsc.org/MaterialsC, DOI: 10.1039/c3tc31749h, 10 pages.

(Continued)

*Primary Examiner* — Tong-Ho Kim
(74) *Attorney, Agent, or Firm* — SQUIRE PATTON BOGGS (US) LLP

(57) ABSTRACT

Described herein are hierarchical porous Pd@PdPt yolk-shell nanoarchitectonics and hollow PdPt nanocages hydrogen sensors, methods of producing the hydrogen sensors, and methods of using the sensors to detect $H_2$ under ambient conditions.

21 Claims, 21 Drawing Sheets

(56) References Cited

OTHER PUBLICATIONS

A.S.M. Iftekhar Uddin et al., "Effects of Pt shell thickness on self-assembly monolayer Pd@Pt core-shell nanocrystals based hydrogen sensing", International Journal of Hydrogen Energy 41 (2016) 15399-15410, www.sciencedirect.com, www.elsevier.com/locate/he, http://dx.doi.org/10.1016/j.ijhydene.2016.06.138, 16 pages.

R.J. Westerwaal et al., "Nanostructured Pd—Au based fiber optic sensors for probing hydrogen concentrations in gas mixtures", International Journal of Hydrogen Energy 38 (2013) 4201-4212, www.sciencedirect.com, www.elsevier.com/locate/he, http://dx.doi.org/10.1016/j.ijhydene.2012.12.146, 12 pages.

Je-A Woo et al., "Fast response of hydrogen sensor using palladium nanocube-TiO2 nanofiber composites", International Journal of Hydrogen Energy 42 (2017) 18754-18761, www.sciencedirect.com, www.elsevier.com/locate/he, http://dx.doi.org/10.1016/j.ijhydene.2017.04.189, 8 pages.

Go Yamamoto et al., "Effects of polytetrafluoroethylene or polyimide coating on H2 sensing properties of anodized TiO2 films equipped with Pd—Pt electrodes", Sensors and Actuators B 183 (2013) 253-264, www.elsevier.com/locate/snb, http://dx.doi.org/10.1016/j.snb.2013.03.136, 12 pages.

Sayaka Yanagida et al., "Preparation of Pd—Pt Co-Loaded TiO2 Thin Films by Sol-Gel Method for Hydrogen Gas Sensing", Journal of the Electrochemical Society, 159 (12) B845-B849, (2012), DOI: 10. 1149/2.059212jes, 5 pages.

Ya Sha Yi et al., "Plasmonic hydrogen sensor based on integrated microring resonator", Optical Engineering 56(12), 121904 (Dec. 2017), doi: 10.1117/1.OE.56.12.121904, 8 pages.

Karel Zdansky et al., "Schottky barriers on InP and GaN made by deposition of colloidal graphite and Pd, Pt or bimetal Pd/Pt nanoparticles for H2-gas detection", Sensors and Actuators B 165 (2012) 104-109, www.elsevier.com/locate/snb, doi:10.1016/j.snb.2012.02.023, 6 pages.

Karel Zdansky et al., "EPD of Reverse Micelle Pd and Pt Nanoparticles onto InP and GaN for High-Response Hydrogen Sensors", Key Engineering Materials vol. 507, (2012), pp. 169-173, doi: 10.4028/www.scientific.net/KEM.507.169, 6 pages.

Chao Zhang et al., "Sensing properties of Pt/Pd activated tungsten oxide films grown by simultaneous radio-frequency sputtering to reducing gases", Sensors and Actuators B 175 (2012) 53-59, www.elsevier.com/locate/snb, doi:10.1016/j.snb.2011.11/060, 7 pages.

Hongli Zhao et al., "Pt—Pd bimetallic nanocoral modified carbon fiber microelectrode as a sensitive hydrogen peroxide sensor for cellular detection", Sensors and Actuators B 260 (2018) 174-182, www.elsevier.com/locate/snb, https://doi.org/10.1016/j.snb.2017.12.179, 13 pages.

Lingde Zhou et al., "Optical Fiber Hydrogen Sensor Based on Magnetron Sputtered Pd/V2O5 Films", Materials Science Forum vols. 663-665 (2011) pp. 898-901, doi:10.4028/www.scientific.net/MSF.663-665.898, 5 pages.

A.V. Almaev et al., "Characteristics of Hydrogen Sensors Based on Thin Tin Dioxide Films Modified with Platinum, Palladium, Silver, and Yttrium", Russian Physics Journal, vol. 61, No. 6, Oct. 2018 (Russian Original No. 6, Jun. 2018), DOI: 10.1007/s11182-018-1510-7, Physics of Semiconductors and Dielectrics, 7 pages.

Jianjun Chen et al., "High-temperature hydrogen sensor based on platinum nanoparticle-decorated SiC nanowire device", Sensors and Actuators B 201 (2014) 402-406, www.elsevier.com/locate/snb, http://dx.doi.org/10.1016/j.snb.2014.04.068, 9 pages.

M. Gaidi et al., "Electrical properties evolution under reducing gaseous mixtures (H2, H2S, CO) of SnO2 think films doped with Pd/Pt aggregates and used as polluting gas sensors", Sensors and Actuators B 62 (2000) 43-48, www.elsevier.nl/locate/sensorb, 6 pages.

Hee-Jin Cho et al., "Pt-Functionalized PdO Nanowires for Room Temperature Hydrogen Gas Sensors", ACS Sensors 2018, 3, 2152-2158, pubs.acs.org/acssensors, DOI:10.1021/acssensors.8b00714, 13 pages.

Soo-Yeon Cho et al., "Ultrasmall Grained Pd Nanopattern H2 Sensor", ACS Sensors 2018, 3, 1876-1883, pubs.acs.org/acssensors, DOI:10.1021/acssensors.8b00834, 17 pages.

Min Gyun Chung et al., "Flexible hydrogen sensors using graphene with passadium nanoparticle decoration", Sensors and Actuators B 169 (2012) 387-392, www.elsevier.com/locate/snb, http://dx.doi.org/10.1016/j.snb.2012.05.031, 6 pages.

Jixiang Dai et al., "Ultra-high sensitive optical fiber hydrogen sensor using self-referenced demodulation method and WO3—Pd2Pt—Pt Composite film", Optics Express 2009, vol. 25, No. 3, Feb. 6, 2017, http://dx.doi.org/10.1364/OE.25.002009, 7 pages.

Jie Deng et al., "Investigation of Influence of Hydrogen Gas on Pd/BST/Pt Device by Impedance Spectroscopy", IEEE Transactions on Ultrasonics, Ferroelectrics, and Frequency Control, vol. 51, No. 8, Aug. 2004, 6 pages.

J. Deng et al., "Characteristics of Pd/BST/Pt for hydrogen detection at different atmospheres", Ferroelectrics, ISSN: 0015-0193 (Print) 1563-5112 (online), Journal homepage: https://www.tandfonline.com/loi/gfer20, https://doi.org/10.1080/00150190108225196, 7 pages.

Frederic Favier et al., "Hydrogen Sensors and Switches from Electrodeposited Palladium Mesowire Arrays", www.sciencemag.org, Science, vol. 293, Sep. 21, 2001, 6 pages.

Kiyoshi Fukui et al., "Effects of tin oxide semiconductor-electrode interface on gas-sensitivity characteristics", Sensors and Actuators B, 13-14 (1993) 589-590, 2 pages.

Kamrul Hassan et al., "Hydrogen sensing properties of Pt/Pd bimetal decorated on highly hydrophobic Si nanowires", International Journal of Hydrogen Energy 41 (2016) 10991-11001, www.sciencedirect.com, www.elsevier.com/locate/he, http://dx.doi.org/10.1016/j.ijhydene.2016.04.124, 11 pages.

Kamrul Hassan et al., Supporting information for "Platinum/palladium bimetallic ultra-thin film decorated on a one-dimensional; ZnO nanorods array for use as fast response flexible hydrogen sensor", and article "Platinum/palladium bimetallic Ultra-thin film decorated on a one-dimensional ZnO nanorods array for use as fast response flexible hydrogen sensor", Materials Letters 176 n(2016) 232-236, www.elsevier.com/locate/matlet, http://dx.doi.org/10.1016/j.matlet.2016/04.138, 7 pages.

Kamrul Hassan et al., "Fabrication and characterization of fast response H2 sensor based on Pd—Pt core-shell nanoparticles decorated Si nanowires cluster", www.sciencedirect.com, Procedia Engineering 168 (2016) 235-238, www.elsevier.com/locate/procedia, 30th Eurosensors Conference, Eurosensors 2016, doi: 10.1016/j.proeng.2016.11.170, 4 pages.

Kamrul Hassan et al., "Fast-response hydrogen sensors based on discrete Pt/Pd bimetallic ultra-thin films", Sensors and Actuators B 234 (2016) 435-445, www.elsevier.com/locate/snb, http://dx.doi.org/10.1016/j.snb.2016.05.013, 13 pages.

Kamrul Hassan et al., "Catalytically activated quantum-size Pt/Pd bimetallic core-shell nanoparticles decorated on ZnO nanorod clusters for accelerated hydrogen gas detection", Sensors and Actuators B 239 (2017) 824-833, www.elsevier.com/locate/snb, http://dx.doi.org/10.1016/j.snb.2016.08.084, 13 pages.

Takeo Hyodo et al., "Effects of surface modification of noble-metal sensing electrodes with Au on the hydrogen-sensing properties of diode-type gas sensors employing an anodized titania film", Sensors and Actuators B 207 (2015) 105-116, www.elsevier.com/locate/snb, http://dx.doi.org/10.1016/j.snb.2014.10.005, 12 pages.

M. Z. Jacobson et al., "Cleaning the Air and Improving Health with Hydrogen Fuel-Cell Vehicles", Science vol. 308, 1901 (2005), DOI: 10.1126/science.1109157, 32 pages.

Jaidev et al., "Room temperature hydrogen gas sensing properties of mono dispersed platinum nanoparticles on graphene-like carbon-wrapped carbon nanotubes", International Journal of Hydrogen Energy 43 (2018) 16421-16429, www.sciencedirect.com, www.elsevier.com/locate/he, https://doi.org/10.1016/j.ijhydene.2018.06.178, 16 pages.

Jung Mo Jin et al., "Long-term durability of Pd/a-WO3 and Pd-Pt/a-WO3 thin films for hydrogen sensors", IAEA International Nuclear Information System, 2 pages.

(56) References Cited

OTHER PUBLICATIONS

Sungwook Joo et al., "Hydrogen Gas Sensor Using Pt- and Pd-Added Anodic TiO2 Nanotube Films", Journal of the Electrochemical Society, 157 (6) J221-J226 (2010), The Electrochemical Society, 6 pages.
Daewoong Jung et al., "Fast-Response Room Temperature Hydrogen Gas Sensors Using Platinum-Coated Spin-Capable Carbon Nanotubes", ACS Applied Materials & Interfaces 2015, 7, 3050-3057, www.acsami.org, DOI: 10.1021/am506578j, 8 pages.
Adarsh Kaniyoor et al., "Nanostrctured Pt decorated graphene and multi walled carbon nanotube based room temperature hydrogen gas sensor", www.rsc.org/nanoscale, Nanoscale, 2009, 1, 382-386, The Royal Society of Chemistry 2009, DOI: 10.1039/b9nr00015a, 5 pages.
T. Kiefer et al., "Fast and robust hydrogen sensors based on discontinuous palladium films on polyimide, fabricated on a wafer scale", Nanotechnology 21, 2010, 515501 (5pp), doi: 10.1088/0957-4484/21/50/505501, 6 pages.
T. Kiefer et al., "A single nanotrench in a palladium microwire for hydrogen detection", Nanotechnology 19, 2008, 125502 (9pp), doi:10.1088/0957-=4484/19/12/125502, 10 pages.
Dong-Ha Kim et al., "High-Resolution, Fast, and Shape-Conformable Hydrogen Sensor Platform: Polymer Nanofiber Yarn Coupled with Nanograined Pd@Pt", ACS Nano 2019, 13, 6071-6082, www.acsnano.org, DOI: 10.1021/acsnano.9b02481, 32 pages.
Won-Tae Koo et al., "Accelerating Palladium Nanowire H2 Sensors Using Engineered Nanofiltration", ACS Nano 2017, 11, 9276-9285, www.acsnano.org, DOI: 10. 1021/acsnano.7b04529, 14 pages.
M. Krishna Kumar et al., "Nanostructured Pt Functionlized Multiwalled Carbon Nanotube Based Hydrogen Sensor", J. Phys. Chem. B 2006, vol. 110, No. 23, 11291-11298, DOI: 10.1021/jp0611525, 8 pages.
M. Krishna Kumar et al., "Palladium dispersed multiwalled carbon nanotube based hydrogen sensor for fuel cell applications", International Journal of Hydrogen Energy 32 (2007) 2518-2526, www.elsevier.com/locate/ijhydene, doi: 10.1016/j.ijhydene.2006.11.015, 9 pages.
Rakesh Kumar et al., "Fast response and recovery of hydrogen sensing in Pd—Pt nanoparticle-graphene composite layers", IOP Publishing Nanotechnology 22 (2011) 275719 (7pp), doi: 10.1088/0957-4484/22/27/275719, 8 pages.
Xiaowei Li et al., "Catalytically Activated Palladium@Platinum Nanowires for Accelerated Hydrogen Gas Detection", ACSNANO 2015, vol. 9, No. 3, 3215-3225, DOI: 10.1021/acsnano.5b00302, 14 pages.
Xiaowei Li et al., "Sub-6 nm Palladium Nanoparticles for Faster, More Sensitive H2 Detection Using Carbon Nanotube Ropes", ACS Sensors 2017, 2, 282-289, pubs.acs.org/acssensors, DOI: 10.1021/acssensors.6b00808, 8 pages.
Chun Liu et al., "An Advanced Pd/Pt Relative Resistance Sensor for the Continuous Monitoring of Dissolved Hydrogen in Aqueous Systems at High Subcritical and Supercritical Temperatures", The Journal of Supercritical Fluids, 1995, vol. 8, No. 3, 263-270, 8 pages.
Bin Liu et al., "Strongly coupled hybrid nanostructures for selective hydrogen detection—understanding the role of noble metals in reducing cross-sensitivity", Nanoscale 2014, 6, 4758, www.rsc.org/nanoscale, Royal Society of Chemistry, DOI: 10. 1039/c3nr06569c, 14 pages.
Giordano Mattoni et al., "Single-Crystal Pt-Decorated WO3 Ultrathin Films: A Platform for Sub-ppm Hydrogen Sensing at Room Temperature", ACS Applied Nano Materials 2018, 1, 3446-3452, www.acsanm.org, DOI: 10.1021/acsanm.8b00627, 18 pages.

Masaki Nakaoka et al., "Hydrogen Sensing Properties of an Anodized TiO2 Film Equipped with a Pd—Pt Electrode", ECS Transactions, 16 (11) 293-299 (2008), The Electrochemical Society, DOI: 10.1149/1.2981131, 7 pages.
P. Offermans et al., "Ultralow-power hydrogen sensing with single palladium nanowires", Applied Physics Letters 94, 223110 (2009), American Institute of Physics, DOI: 10.1063/1.3132064, 3 pages.
S. Ozturk et al., "The Effects of Annealing on Gas Sensing Properties of ZnO Nanorod Sensors Coated with Pd and Pt", www.sciencedirect.com, Procedia Engineering 47 (2012), 434-437, www.elsevier.com/locate/procedia, Proc. Eurosensors XXVI, Sep. 9-12, 2012, Krakow, Poland, doi: 10.1016/j.proeng.2012.09.177, 4 pages.
Yusin Pak et al., "Palladium Nanoribbon Array for Fast Hydrogen Gas Sensing with Ultrahigh Sensitivity", Materials Views, www.MaterialsViews.com, Advanced Materials 2015, 27, 6945-6952, www.advmat.de, DOI: 10.1002/adma.201502895, 19 pages.
Yitian Peng et al., "The hydrogen sensing properties of Pt-Pd/reduced graphene oxide based sensor under different operating conditions", RSC Advances, 2016, 6, 24880, Royal Society of Chemistry 2016, www.rsc.org/advances, DOI: 10/1039/c5ra26618a, 9 pages.
Reginald M. Penner, "A Nose for Hydrogen Gas: Fast, Sensitive H2 Sensors Using Electrodeposited Nanomaterials", Accounts of Chemical Research 2017, 50, 1902-1910, pubs.acs.org/accounts, DOI: 10.1021/acs.accounts.7b00163, 9 pages.
Cedric Perrotton et al., "A reliable, sensitive and fast optical fiber hydrogen sensor based on surface plasmon resonance", Jan. 14, 2013, vol. 21, No. 1, Optics Express, 9 pages.
Duy-Thach Phan et al., "A large detectable-range, high-response and fast-response resistivity hydrogen sensor based on Pt/Pd core-shell hybrid with graphene", Sensors and Actuators B 220 (2015) 962-967, www.elsevier.com/locate/snb, http://dx.doi.org/10.1016/j.snb.2015.06.029, 6 pages.
Khalil Rajoua et al., "Electronic and Mechanical Antagonist Effets in Resistive Hydrogen Sensors Based on Pd@Au Core-Shell Nanoparticle Assemblies Prepared by Langmuir-Blodgett", The Journal of Physical Chemistry C 2015, 119, 10130-10139, pubs.acs.org/JPCC, DOI: 10.1021/acs.jpcc.5b01636, 19 pages.
L.K. Randeniya et al., "Detection of hydrogen using multi-walled carbon-nanotube yarns coated with nanocrystalline Pd and Pd/Pt layered structures", Carbon 50 (2012) 1786-1792, www.sciencedirect.com, www.elsevier.com/locate/carbon, doi:10.1016/j.carbon.2011.12.026, 7 pages.
Patrcia A. Russo et al., "Room-Temperature Hydrogen Sensing with Heteronamostructures Based on Reduced Graphene Oxide and Tin Oxide", Sensors, Angewandte Chemie International Edition 2012, 451, 11053-11057, DOI: 10.1002/anie.201204373, 27 pages.
Neslihan Sarica et al., "Characterization and gas sensing performances of noble metals decorated CuO nanorods", Thin Solid Films 685 (2019) 321-328, www.elsevier.com/locate/tsf, https://doi.org/10.1016/j.tsf.2019.06.046, 8 pages.
Jae Young Shim et al., "Pd—Pt alloy as a catalyst in gasochromic thin films for hydrogen sensors", Solar Energy Materials & Solar Cells 93 (2009) 2133-2137, www.elsevier.com/locate/solmat, doi:10.1016/j.solmat.2009.01.004, 5 pages.
Jae Young Shim et al., "Comparison of Pd, Pt and Pt/Pd as Catalysts for Hydrogen Sensor Films", Journal of the Korean Physical Society, vol. 55, No. 6, Dec. 2009, pp. 2693-2696, 4 pages.
Narendra Singh et al., "Hydrogen gas sensing properties of platinum decorated silicon carbide (Pt—SiC) Nanoballs", Sensors and Actuators B 262 (2018) 162-170, www.elsevier.com/locate/snb, https://doi.org/10.1016/j.snb.2018.01.216, 12 pages.

* cited by examiner

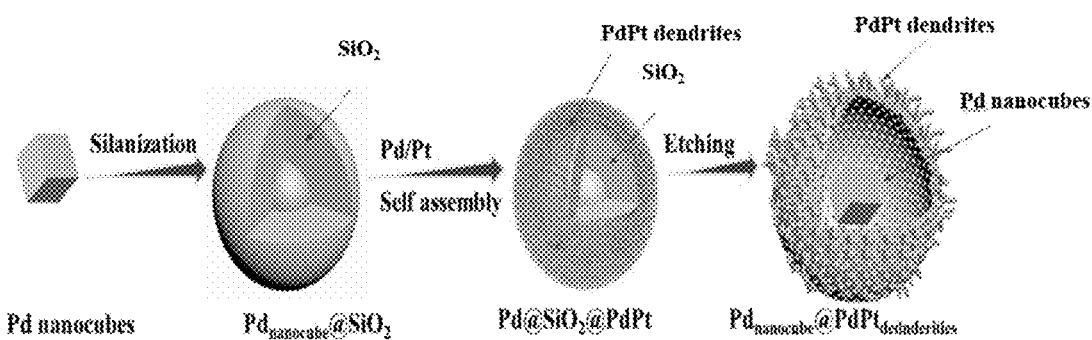
FIG. 1
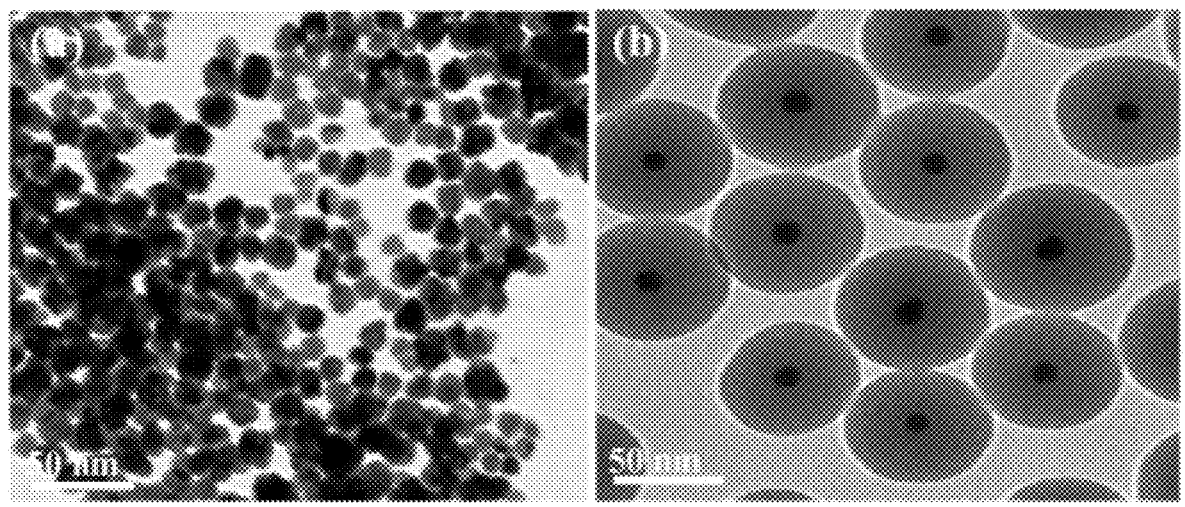
FIG. 2A
FIG. 2B

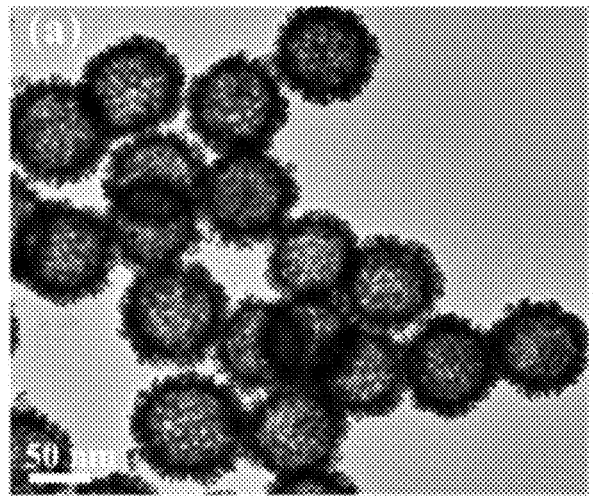 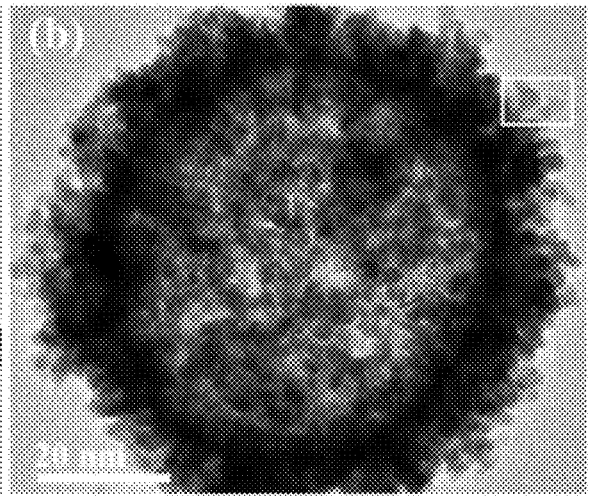
FIG. 12 A　　　　　　　　　　FIG. 12B
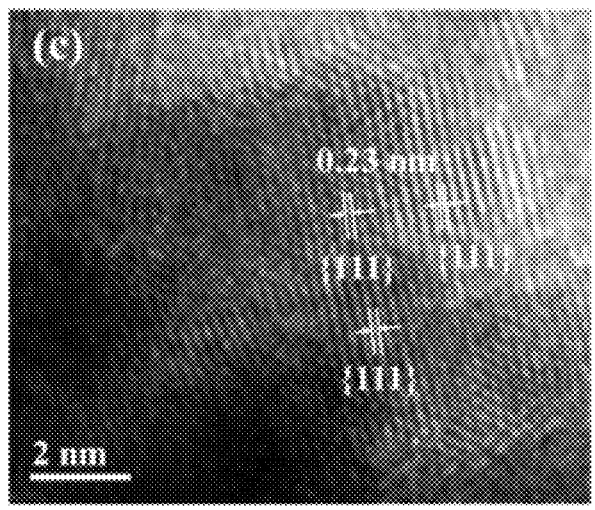 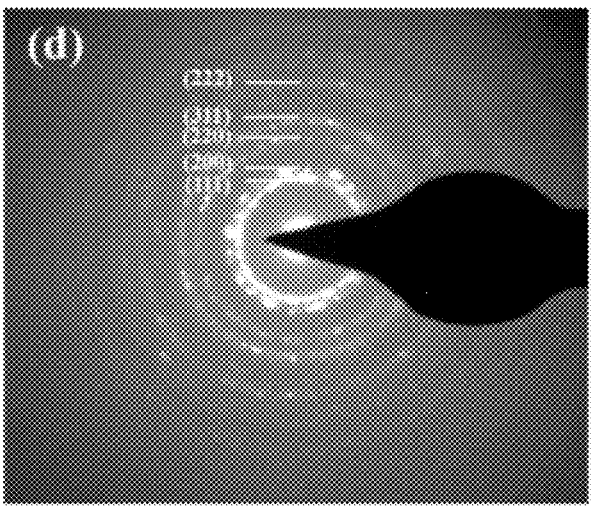
FIG. 12C　　　　　　　　　　FIG. 12D

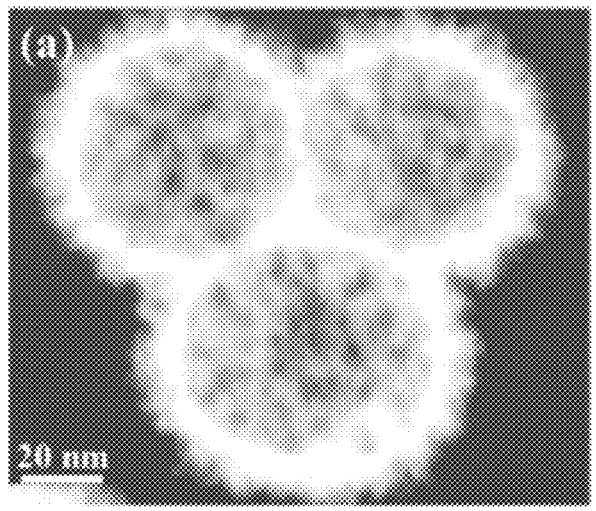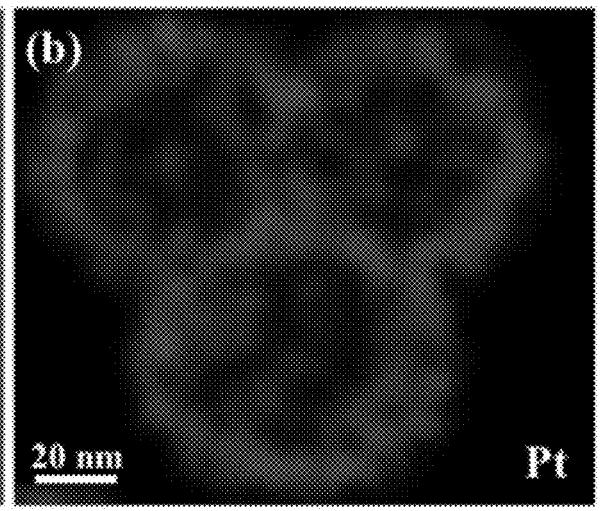
FIG. 13A               FIG. 13B
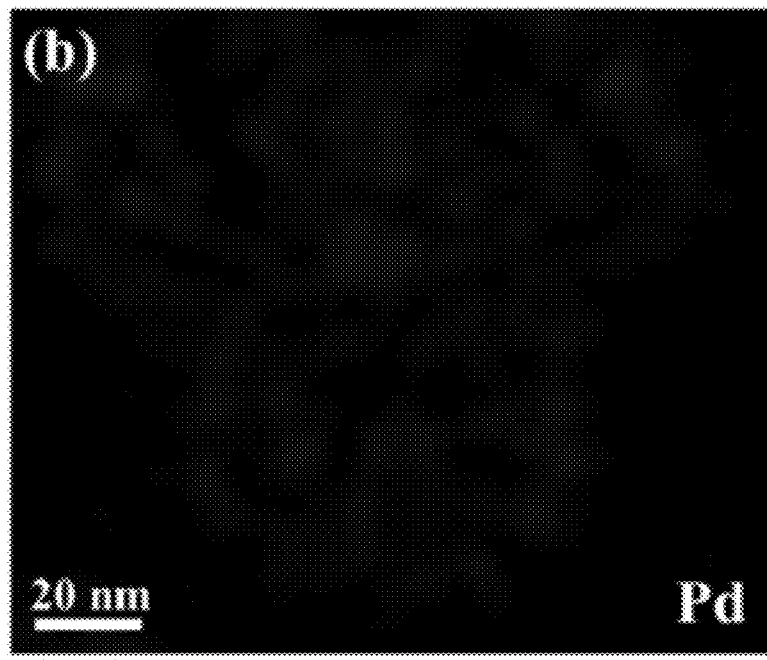
FIG. 13C

SELF-ASSEMBLED HIERARCHICAL POROUS Pd@PdPt YOLK-SHELL NANOARCHITICTONICS AND HOLLOW PDPT NANOCAGES HYDROGEN SENSORS

CROSS-REFERENCE TO RELATED APPLICATIONS

This application claims priority to, and the benefit of, U.S. Ser. No. 63/348,394 filed Jun. 2, 2022, the entirety of which is herein incorporated for all purposes.

FIELD OF INVENTION

Described herein are hierarchical porous Pd@PdPt yolk-shell nanoarchitectonics and hollow PdPt nanocages hydrogen sensors, methods of producing the hydrogen sensors, and methods of using the sensors to detect $H_2$ under ambient conditions.

BACKGROUND OF THE INVENTION

Hydrogen ($H_2$) is an important green energy source due to its zero-emission combustion and high energy density, which is 3-fold that of traditional fossil fuels (Cho, S.-Y.; et al., ACS sensors 2018, 3 (9), 1876-1883; Jacobson, M. Z.; et al., Science 2005, 308 (5730), 1901-1905; Penner, R. M., *Accounts of Chemical Research* 2017, 50 (8), 1902-1910). $H_2$ is colorless and susceptible to leakage, which is dangerous because it has high ignition ability. For this reason, using $H_2$ as an energy source for large-scale applications requires efficient $H_2$ sensors. Chemiresistive or electrical sensors based on transition metal oxides (i.e., ZnO, $SnO_2$, CuO, etc.), noble metals (i.e., Pd, Pt, Ir), or a hybrid have recently been developed.

The rational design of Pd-based, Pt-based, and/or PdPt-based nanostructures for $H_2$ gas sensing has attracted much attention in the last few decades as their electric conductivity, electric circuits, electric current-potential relationship, electric impedance, and electric resistance have been researched. Notably, previous reports focused only on Pd, Pt, or PdPt supported on different carbon-based supports (i.e., graphene, graphene oxide, carbon nanotubes, metal-organic framework), semiconductores ($TiO_2$, CuO, $WO_3$, ZnO, and $SnO_2$), and polymer-based supports (i.e., polyvinyl alcohol, polyaniline, and nafion). However, the high mass production of hierarchical porous multimetallic nanocrystals with tunable size, shape, and composition remains a great challenge for $H_2$ sensing applications. Further, scalable Pd-based sensors capable of detecting $H_2$ concentrations ≥2 v % quickly without causing physical destruction to the sensor remains a daunting challenge. Therefore, what is needed are durable chemiresistance $H_2$ sensors that can be used at room temperature and in large concentrations of $H_2$. In particular, neither hierarchical porous Pd@PdPt yolk-shell spatial nanoarchitectonics nor PdPt nanocages for efficient hydrogen sensing applications have been reported.

SUMMARY OF THE INVENTION

Described herein are Pd@PdPt yolk-shell nanoarchitectonics comprising a Pd nanocube core wrapped by a hierarchal porous shell and PdPt porous spatial nanodendrites with hyper-branched arms. Also described herein are hollow PdPt nanocages with hyper-branched arms. Both the hierarchical porous Pd@PtPd yolk-shell nanoarchitectonics and hollow PdPt nanocages have ordered interconnected pores over the entire exterior surface as well as a hyper-branched outer shell. As described herein, the nanoarchitectonics and nanocages are produced in high yield (100%) with high mass production (gram-scale in one run) at room temperature, making their synthesis energy-efficient and eco-friendly.

Also described herein is the use of the Pd@PdPt yolk-shell nanoarchitectonics and hollow PdPt nanocages as chemiresistance $H_2$ sensors. These free-standing Pd@PtPd yolk-shell and hollow PdPt nanocages allow for efficient, sensitive, and selective $H_2$ detection even at low and high concentrations of $H_2$ in air, $N_2$, or a mixture of air and $N_2$ at temperatures ranging from about 25-50° C. In one embodiment, the concentration of $H_2$ is about 0.05 v % to 12 v %, and in certain embodiments, about 0.2-8 v %. Further, the sensors are not damaged during the detection. In particular, distinct from previous Pd-based sensors, the interconnected porous yolk shell described herein maximizes the utilization of the Pd core and the PdPt shell during $H_2$ detection, which provides for an advantageous sensor.

In certain embodiments, and as shown in Table 1, the $H_2$ gas detection limit ranged from about 0.2 v % to 8 v % at 25° C. The sensors also exhibit a fast response time. In certain embodiments, the sensor provides a response time ranging from between about seconds to 170 seconds in the presence of $H_2$ at a concentration ranging between about v % and 8 v % at both 25° C. and 50° C. in air. In one embodiment, the hydrogen response time is 90 seconds.

BRIEF DESCRIPTION OF DRAWINGS

FIG. 1 is a scheme illustrating the fabrication process of the $Pd_{nanocube}$@$PdPt_{nanodendrites}$ yolk-shell described herein.

FIG. 2A is a TEM image of the Pd nanocubes.

FIG. 2B is a TEM image of Pd@$SiO_2$@PdPt.

FIG. 12A is a TEM image of the PdPt nanocages.

FIG. 12B is a TEM image of the PdPt nanocages.

FIG. 12C is an HRTEM image of the marked area in the shell in FIG. 12B.

FIG. 12D is a SAED image of the PdPt nanocages.

FIG. 13A is an HAADF-STEM image of the PdPt nanocages and its EDS elemental mapping analysis.

FIG. 13B is an HAADF-STEM image of the PdPt nanocages and its EDS elemental mapping analysis for Pd.

FIG. 13C is an HAADF-STEM image of the PdPt nanocages and its EDS elemental mapping analysis for Pt.

DETAILED DESCRIPTION OF THE INVENTION

Described herein are hierarchical porous Pd@PdPt yolk-shell nanoarchitectonics ($Pd_{nanocube}@PdPt_{nanodendrites}$ yolk-shell) and hollow PdPt nanocages with ordered interconnected pores over the entire interior and exterior surface and a branched outer shell. The $Pd_{nanocube}@PdPt_{nanodendrites}$ yolk-shell comprises a Pd nanocube core coated with a hierarchal porous layer and PdPt porous spatial nanodendrites. The hollow PdPt nanocages comprise a hollow core and PdPt porous nanodendrites. Both the $Pd_{nanocube}@PdPt_{nanodendrites}$ yolk-shells and PdPt nanocages are formed via energy-efficient and eco-friendly one-pot reactions with high yield (100%) and high mass production (gram-scale in one run) at room temperature without any hazardous chemicals. These freestanding $Pd_{nanocube}@PdPt_{nanodendrites}$ yolk-shell and hollow PdPt nanocages efficiently, sensitively, and selectively detect $H_2$ without undergoing physical destruction even at low and high concentrations of $H_2$ (about 0.1 v %-8 v %) in air at about room temperature and 50° C. The $H_2$ response time of the freestanding $Pd_{nanocube}@PdPt_{nanodendrites}$ yolk-shells and hollow PdPt nanocages is in the range of about 90 to 170 seconds in the air at about room temperature and at 50° C. In one embodiment, the hydrogen response time is less than 30 seconds to allow for efficient large-scale applications. In certain embodiments, the response time of less than 30 seconds can be achieved by carrying out a set of consecutive reaction experiments, using carbonaceous support or transition metal oxide support or by increasing the amount of Pd.

The $Pd_{nanocube}@PdPt_{nanodendrites}$ yolk-shells and hollow PdPt nanocages described herein combine the unique physiochemical merits of multimetallic (electronic, bifunctional, synergism) and inherent catalytic properties, high porosity (electron-rich density, high surface area to volume ratio and massive accessible active adsorption sites), core-shell shapes (electronic effect, and bifunctional mechanism), and porous shapes (great $H_2$ adsorption/desorption, mechanical stability, quick diffusion rate and a high tolerance for the reaction intermediates or products). The $Pd_{nanocube}@PdPt_{nanodendrites}$ yolk-shells comprise a Pd nanocube core wrapped by a hierarchal porous shell and PdPt porous spatial nanodendrites with hyperbranched arms. The hollow PdPt nanocages are made of a hollow core and PdPt porous nanodendrites.

Figure 11:
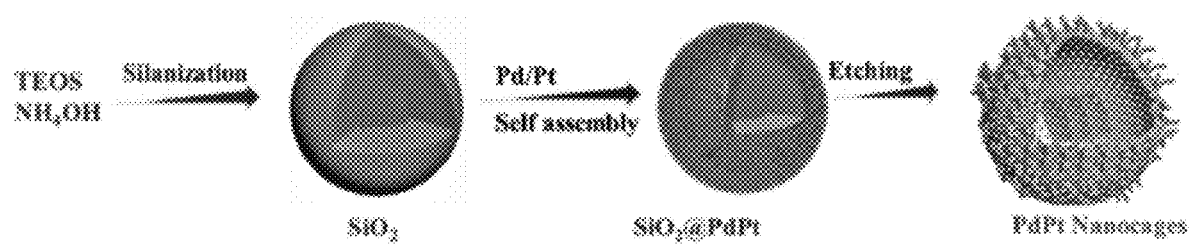
FIG. 11 is a scheme illustrating the fabrication process of the PdPt nanocages described herein.

Also described herein is the straightforward and high yielding synthesis of the $Pd_{nanocube}$@$PdPt_{nanodendrites}$ yolk-shell and hollow PdPt nanocage sensors. The synthetic approach is a combination between the stöber method and self-assembly and template-based approaches. To synthesize the $Pd_{nanocube}$@$PdPt_{nanodendrites}$ yolk-shell, a Pd nanocube core is formed and coated with a $SiO_2$ layer via silanization and are then coated with PdPt nanodendrites via self-assembly (FIG. 1). Finally selective eroding of the $SiO_2$ forms the yolk-shell. The PdPt nanocages are also formed via silanization, self-assembly, and selective eroding (FIG. 11).

The shape and composition of the nanostructures can be tuned by changing the type and concentrations of the metal precursors. Unlike previous approaches, the method described herein is facile, one-pot, easy to adjust to tailor the size, shape and composition of the hierarchical porous multimetallic nanocrystals, high yielding, and can be conducted at room temperature. For example, the core and shell could easily comprise binary or ternary metals. Further, the method can be used for the production of free-standing or supported porous nanoarchitectonics with different compositions. The production of $Pd_{nanocube}$@$PdPt_{nanodendrites}$ yolk-shell and hollow PdPt nanocages is also feasible for large-scale applications as they are one-pot and green (no hazardous chemicals or organic solvents are used and they are conducted at room temperature), with a high mass production (up to several grams in one run).

In one embodiment, the $Pd_{nanocube}$@$PdPt_{nanodendrites}$ yolk-shell and hollow PdPt nanocages described herein are used as efficient, low-cost, durable, and scalable sensors for $H_2$ detection at room temperature and up to about 50° C. in air. These $Pd_{nanocube}$@$PdPt_{nanodendrites}$ yolk-shell and hollow PdPt nanocages detect $H_2$ without any support, and are therefore highly cost-effective. The sensors are also compatible with many substrates, including, but not limited to, $SiO_2$/Si, polymers or carbon.

Unlike previously developed sensors, the sensors described herein are capable of prompt detection (within only about 90 seconds to 170 seconds) of $H_2$ at various concentrations ranging from about 0.2 v % to 8 v %. Further, the detection does not cause any kind of physical distortion or destruction to the Pd core or the PdPt shell. In one embodiment, the $Pd_{nanocube}$@$PdPt_{nanodendrites}$ yolk-shells and hollow PdPt nanocages are used for $H_2$ detection at room temperature and at about 50° C. in air. Further, the sensor works at a low voltage of about 1 V and the detection requires only a few microliters (10-20 μL) of the $Pd_{nanocube}$@$PdPt_{nanodendrites}$ yolk-shells or hollow PdPt nanocages.

In alternative embodiments, the the $Pd_{nanocube}$@$PdPt_{nanodendrites}$ yolk-shells or hollow PdPt nanocages detect CO or $H_2S$.

Pd@PdPt Yolk-Shell Nanoarchitectonics ($Pd_{nanocube}$@$PdPt_{nanodendrites}$ Yolk Shell)

Described herein are $Pd_{nanocube}$@$PdPt_{nanodendrites}$ yolk-shells comprising a Pd nanocube core wrapped by a hierarchal porous shell and PdPt porous spatial nanodendrites with hyper-branched arms. In one embodiment, the nanocube of the $Pd_{nanocube}$@$PdPt_{nanodendrites}$ yolk-shell has a diameter of about 5 nm to 15 nm, about 7 nm to about 14 nm, or about 8 nm to 12 nm. In one embodiment, the nanocube has a diameter of about 10 nm.

In one embodiment, the $Pd_{nanocube}$@$PdPt_{nanodendrites}$ yolk-shell has a diameter of about 60 nm to 100 nm, about 70 nm to 90 nm, or about 75 nm to 85 nm. In one embodiment, the $Pd_{nanocube}$@$PdPt_{nanodendrites}$ yolk-shell has a diameter of about 80 nm. In one embodiment, the nanocube of the $Pd_{nanocube}$@$PdPt_{nanodendrites}$ yolk-shell comprises nanospheres. In one embodiment, the nanocube of the $Pd_{nanocube}$@$PdPt_{nanodendrites}$ yolk-shell comprises a noble metal, including, but not limited to Pt, Au, Ag, or Ir, or transition metal oxide, including, but not limited to, CuO, ZnO, $Fe_2O_3$, $Fe_3O_4$, or SnO nanoparticles. In one embodiment, the $Pd_{nanocube}$@$PdPt_{nanodendrites}$ yolk-shell is hollow and has a 1D shape.

In one embodiment, the branches of the $Pd_{nanocube}$@$PdPt_{nanodendrites}$ yolk-shell have an average thickness of about 20 nm to 40 nm, about 25 nm to 35 nm, or about 28 nm to 32 nm. In one embodiment, the branches of the $Pd_{nanocube}$@$PdPt_{nanodendrites}$ yolk-shell have an average thickness of about 30 nm.

The $Pd_{nanocube}$@$PdPt_{nanodendrites}$ yolk-shell have a hierarchal porous shell. In one embodiment, the shell of the $Pd_{nanocube}$@$PdPt_{nanodendrites}$ yolk-shell is both mesoporous and macroporous, for example, the shell is characterized by pores that are less than about 2 nm and pores that are greater than about 10 nm.

The shell of the $Pd_{nanocube}$@$PdPt_{nanodendrites}$ yolk-shell is a homogenous distribution of Pd and Pt, while the core is Pd. In certain embodiments, the atomic ratio of Pd to Pt in the $Pd_{nanocube}$@$PdPt_{nanodendrites}$ yolk-shell is about 1:1 to 3:2 as measured by EDS elemental mapping. In one embodiment, the atomic ratio of Pd to Pt in the $Pd_{nanocube}$@$PdPt_{nanodendrites}$ yolk-shell is about 1:1. In one embodiment, the atomic ratio of Pd to Pt in the $Pd_{nanocube}$@$PdPt_{nanodendrites}$ yolk-shell is about 3:2.5. In one embodiment, the atomic ratio of Pd to Pt in the $Pd_{nanocube}$@$PdPt_{nanodendrites}$ yolk-shell is about 3:2.

In certain embodiments, the $Pd_{nanocube}$@$PdPt_{nanodendrites}$ yolk-shell is characterized by {111}, {211}, {200}, {220}, and {311} facets as measured via X-ray diffraction. In one embodiment, the $Pd_{nanocube}$@$PdPt_{nanodendrites}$ yolk-shell is characterized by an X-ray diffraction pattern similar to that of FIG. 5A.

In certain embodiments, the XPS (X-ray photoelectron spectroscopy) spectrum of the $Pd_{nanocube}$@$PdPt_{nanodendrites}$ yolk-shell comprises at least a Pt 4f and Pd 3d peak. In one embodiment, the Pt 4f peak is at about 70.8 eV and the Pd 3d peak is at about 74.2 eV. In one embodiment, the surface atomic ratio of Pt and Pd as measured by XPS are about 45:55, about 50:50, or about 55:45. In one embodiment, the surface atomic ratio of Pt and Pd as measured by XPS is between about 52:48 to 58:42. In one embodiment, the surface atomic ratio of Pt and Pd as measured by XPS is 55:45.

In one embodiment, the $Pd_{nanocube}$@$PdPt_{nanodendrites}$ yolk-shell is deposited on a $SiO_2$/Si matrix formed by depositing the $Pd_{nanocube}$@$PdPt_{nanodendrites}$ yolk-shell on the $SiO_2$/Si matrix to form an ohmic contact layer. In certain embodiments, the ohmic contact layer comprises $SiO_2$/Si, quartz, Nafion, or optical microfibers.

In one embodiment, the nanocube and/or shell of the $Pd_{nanocube}$@$PdPt_{nanodendrites}$ yolk-shell comprises one or more strong reductants selected from a group comprising $NaBH_4$ and $LiAlF_4$.

In one embodiment, the nanocube and/or shell of the $Pd_{nanocube}$@$PdPt_{nanodendrites}$ yolk-shell comprises one or more types of non-metal ions selected from KI, KBr, KCl, and NaOH, HBr, and $HClO_4$.

In one embodiment, the nanocube and/or the shell of the $Pd_{nanocube}$@$PdPt_{nanodendrites}$ yolk-shell comprises nanospheres.

The synthesis of the Pd$_{nanocube}$@PdPt$_{nanodendrites}$ yolk-shell is shown in FIG. 1. In certain embodiments, the synthesis of the Pd$_{nanocube}$@PdPt$_{nanodendrites}$ yolk-shell comprises the following steps:
(a) synthesis of a Pd nanocube;
(b) coating of the Pd nanocube with a SiO$_2$ layer via silanization to afford Pd$_{nanocube}$@SiO$_2$;
(c) forming the PdPt nanodendrites via self-assembly to afford Pd@SiO$_2$@PdPt; and
(d) etching of the SiO$_2$ layer to afford the Pd$_{nanocube}$@PdPt$_{nanodendrites}$ yolk-shell.

In one embodiment, the Pd nanocube is synthesized by mixing a Pd source, a pluronic, and an acid with sonication. The resulting solution is centrifuged and washed. In one embodiment, the Pd source is Na$_2$PdCl$_4$. In one embodiment, the pluronic is Pluronic F-127. In one embodiment, the acid is ascorbic acid.

In an alternative embodiment, the Pd nanocube is synthesized by mixing a Pd source, a non-ionic co-polymer, and an acid with sonication. Non-limiting examples of the non-ionic co-polymer include polyvinylpyrrolidone and polyethylene glycol hexadecyl ether (polyoxyethylene (20) cetyl ether).

In an alternative embodiment, the Pd nanocube is synthesized by mixing a Pd source, an ionic co-polymer, and an acid with sonication. Non-limiting examples of the ionic co-polymer include hexadecyltrimethylammonium bromide and hexadecyltrimethylammonium chloride.

In one embodiment, the Pd nanocube is coated with tetraethyl orthosilicate (TEOS) to afford Pd$_{nanocube}$@SiO$_2$.

In one embodiment, the PdPt nanodendrites are formed via self-assembly by first synthesizing (3-aminopropyl)trimethoxysilane (APTMS)-modified Pd$_{nanocube}$@SiO$_2$. The APTMS-modified Pd$_{nanocube}$@SiO$_2$ is then mixed with a Pt source and a Pd source, a pluronic, and an acid under sonication to afford the Pd$_{nanocube}$@PdPt$_{nanodendrites}$ yolk-shell. In one embodiment, the Pt source is K$_2$PtCl$_4$. In one embodiment, the Pd source is Na$_2$PdCl$_4$. In one embodiment, the pluronic is Pluronic F-127. In one embodiment, the acid is ascorbic acid.

PdPt Nanocages

Also described herein are hollow PdPt nanocages that comprise a hollow core and PdPt porous nanodendrites. In one embodiment, the PdPt nanocage has a diameter of about 60 nm to 100 nm, about 70 nm to 90 nm, or about 75 nm to 85 nm. In one embodiment, the PdPt nanocage has a diameter of about 80 nm. In one embodiment, the average thickness of the dendritic shell of the PdPt nanocage is about 20 nm to 40 nm, about 25 nm to 35 nm, or about 28 nm to 32 nm. In one embodiment, the average thickness of the dendritic shell of the PdPt nanocage is about 30 nm.

The PdPt nanocages have a hierarchal porous shell. In one embodiment, the shell of the PdPt nanocage is both mesoporous and macroporous, for example, the shell is characterized by pores that are less than about 2 nm and pores that are greater than about 10 nm.

The PdPt nanocage is a homogenous distribution of Pd and Pt. In certain embodiments, the atomic ratio of Pd to Pt in the PdPt nanocage is about 1:1 to 3:2 as measured by EDS elemental mapping. In one embodiment, the atomic ratio of Pd to Pt in the PdPt nanocage is about 1:1. In one embodiment, the atomic ratio of Pd to Pt in the PdPt nanocage is about 3:2.5. In one embodiment, the atomic ratio of Pd to Pt in the PdPt nanocage is about 3:2.

Figure 14:
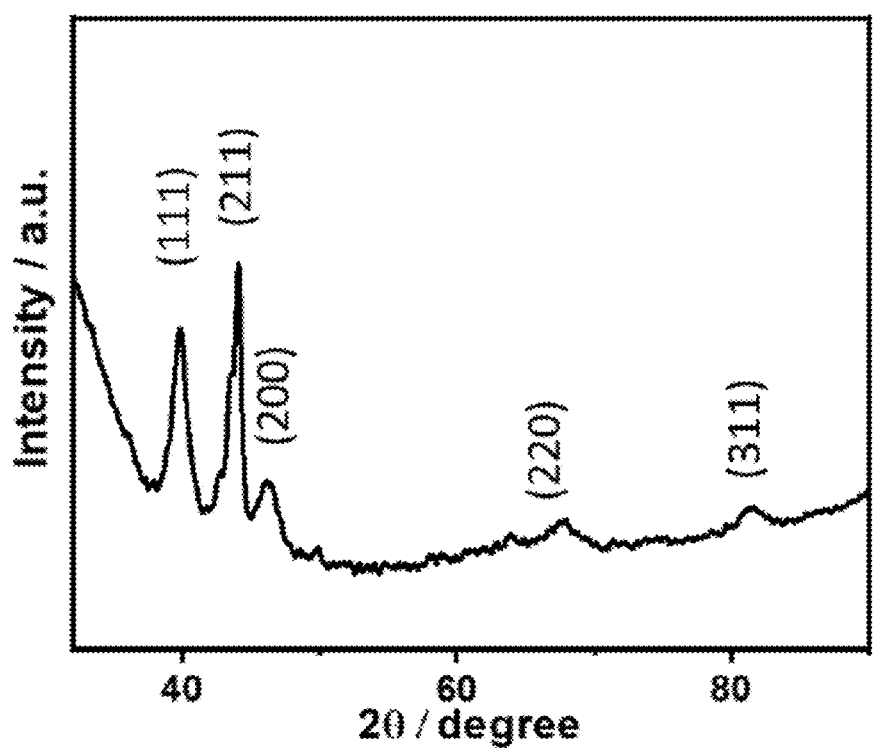
FIG. 14 is an XRD spectrum of the PdPt nanocages.

In certain embodiments, the PdPt nanocage is characterized by {111}, {211}, {200}, {220}, and {311} facets as measured via X-ray diffraction. In one embodiment, the PdPt nanocage is characterized by an X-ray diffraction pattern similar to that of FIG. 14.

In certain embodiments, the XPS (X-ray photoelectron spectroscopy) spectrum of the PdPt nanocage comprises at least a Pt 4f and Pd 3d peak. In one embodiment, the Pt 4f peak is at about 70.4 eV and the Pd 3d peak is at about 74.5 eV. In one embodiment, the surface atomic ratio of Pt and Pd as measured by XPS are about 40:60, about 45:44, about 50:50, about 55:45, or about 60:40. In one embodiment, the surface atomic ratio of Pt and Pd as measured by XPS is between about 52:48 to 58:42. In one embodiment, the surface atomic ratio of Pt and Pd as measured by XPS is about 56:44.

The synthesis of the PdPt nanocages is shown in FIG. 11. In certain embodiments, the synthesis of the PdPt nanocages comprises the following steps:
(a) synthesis of SiO$_2$ nanoparticles;
(b) forming the PdPt nanodendrites over the SiO$_2$ nanoparticles via self-assembly to afford SiO$_2$@PdPt; and
(c) etching of the SiO$_2$ layer to afford the PdPt nanocages.

In one embodiment, the SiO$_2$ nanoparticles are made from tetraethyl orthosilicate (TEOS).

In one embodiment, the PdPt nanodendrites over the SiO$_2$ nanoparticles are formed via self-assembly by first synthesizing (3-aminopropyl)trimethoxysilane (APTMS)-modified SiO$_2$ nanoparticles. The APTMS-modified SiO$_2$ nanoparticles are then mixed with a Pt source and a Pd source, a pluronic, and an acid under sonication to afford the PdPt nanocages. In one embodiment, the Pt source is K$_2$PtCl$_4$. In one embodiment, the Pd source is Na$_2$PdCl$_4$. In one embodiment, the pluronic is Pluronic F-127. In one embodiment, the acid is ascorbic acid.

In an alternative embodiment, the APTMS-modified SiO$_2$ nanoparticles are mixed with a Pt source and a Pd source, a non-ionic co-polymer, and an acid under sonication. Non-limiting examples of the non-ionic co-polymer include polyvinylpyrrolidone and polyethylene glycol hexadecyl ether (polyoxyethylene (20) cetyl ether).

In an alternative embodiment, the APTMS-modified SiO$_2$ nanoparticles are mixed with a Pt source and a Pd source, an ionic co-polymer, and an acid under sonication. Non-limiting examples of the ionic co-polymer include hexadecyltrimethylammonium bromide and hexadecyltrimethylammonium chloride.

In one embodiment, the Pd$_{nanocube}$@PdPt$_{nanodendrites}$ or the PdPt nanocage is free-standing. In an alternative embodiment, the Pd$_{nanocube}$@PdPt$_{nanodendrites}$ or the PdPt nanocage is supported, for example on a polymer-based support, a carbon-based support, or a semiconductor. In one embodiment, the polymer-based support is polyvinyl alcohol-based, polyaniline-based, polyvinylpyrrolidone-based, or nafion-based. In one embodiment, the carbon-based support is graphene, graphene oxide, a carbon nanotube, carbon nitride, a MXene, or a metal-organic framework. In one embodiment, the support is a semiconductor, for example, TiO$_2$, CuO, WO$_3$, ZnO, or SnO$_2$.

In one embodiment, the Pd$_{nanocube}$@PdPt$_{nanodendrites}$ or the PdPt nanocage are supported on a printed microchip comprising Au, Pt, Al, Ag, Sn, and Cu channels.

Method of H$_2$ Detection

The Pd$_{nanocube}$@PdPt$_{nanodendrites}$ yolk-shell or the PdPt nanocage are H$_2$ sensors that detect H$_2$ via a chemiresistive process. In an alternative embodiment, the detection is done electrochemically. In one embodiment, the Pd$_{nanocube}$@PdPt$_{nanodendrites}$ yolk-shell or the PdPt nanocage detect H$_2$ at a concentration from about 0.05 v % to 12 v % in air, N$_2$, or a mixture of air and N$_2$ at a temperature between about 5-90° C. In one embodiment, the $Pd_{nanocube}@PdPt_{nanodendrites}$ yolk-shell or the PdPt nanocage detect $H_2$ in air. In one embodiment, the $Pd_{nanocube}@PdPt_{nanodendrites}$ yolk-shell or the PdPt nanocage detect $H_2$ in $N_2$. In one embodiment, the $Pd_{nanocube}@PdPt_{nanodendrites}$ yolk-shell or the PdPt nanocage detect $H_2$ in a mixture of air and $N_2$. In one embodiment, the $Pd_{nanocube}@PdPt_{nanodendrites}$ yolk-shell or the PdPt nanocage detect $H_2$ at a temperature between about 25-90° C. In one embodiment, the $Pd_{nanocube}@PdPt_{nanodendrites}$ yolk-shell or the PdPt nanocage detect $H_2$ at a temperature between about 25-50° C. In one embodiment, the $Pd_{nanocube}@PdPt_{nanodendrites}$ yolk-shell or the PdPt nanocage detect $H_2$ at a temperature of 25° C. In one embodiment, the $Pd_{nanocube}@PdPt_{nanodendrites}$ yolk-shell or the PdPt nanocage detect $H_2$ at a temperature of 50° C.

In one embodiment, the $Pd_{nanocube}@PdPt_{nanodendrites}$ yolk-shell or the PdPt nanocage detect $H_2$ at a concentration from about 0.05 v % to 12 v % in air, $N_2$, or a mixture of air and $N_2$ at a temperature between about 25-90° C.

In one embodiment, the $Pd_{nanocube}@PdPt_{nanodendrites}$ yolk-shell or the PdPt nanocage detect $H_2$ at a concentration from about 0.1-4000 ppm in air, $N_2$, or a mixture of air and $N_2$ at a temperature between about 5-90° C.

In one embodiment, the $H_2$ detection limit of the yolk shell or nanocage sensors ranges from about 0.2 v % to 8 v % at 25° C. in air. In one embodiment, the $H_2$ detection limit of the yolk shell or nanocage sensors ranges from about 0.2 v % to 6 v % at 50° C. in air. In one embodiment, the $H_2$ response time of the yolk shell or nanocage sensors ranges from between about 90 seconds to 170 seconds in a $H_2$ concentration of about 0.2 v % to 8 v % at about 25 or 50° C. in air. In one embodiment the concentration of $H_2$ is 0.1-4000 ppm in air, $N_2$, or a mixture of air and $N_2$. In one embodiment, the response time is between about 120 seconds and 150 seconds.

In certain embodiments, the yolk shell or nanocage sensors do not undergo any physical distortion or destruction of the Pd core or PdPt shell during the $H_2$ detection, even at a $H_2$ concentration as high as about 8 v %.

In one embodiment, the $H_2$ detection is carried out under an applied voltage of 0.1-2 V.

In one embodiment, the response time of the PdPt nanocage is between about 100 and 140 seconds when measured at room temperature in a $H_2$ concentration of about 4 v %. In one embodiment, the response time of the PdPt nanocage is between about 20 and 60 seconds when measured at 50° C. in a $H_2$ concentration of about 4 v %.

In one embodiment, the response time of the $Pd_{nanocube}@PdPt_{nanodendrites}$ yolk-shell is between about 110 and 150 seconds when measured at room temperature in a $H_2$ concentration of about 4 v %. In one embodiment, the response time of the $Pd_{nanocube}@PdPt_{nanodendrites}$ yolk-shell is between about 120 and 170 seconds when measured at 50° C. in a $H_2$ concentration of about 4 v %.

In one embodiment, the $Pd_{nanocube}@PdPt_{nanodendrites}$ yolk-shell or the PdPt nanocage detect $H_2$ at a concentration from about 0.1-4000 ppm in air, $N_2$, or a mixture of air and $N_2$ at a temperature between about 5-90° C. wherein the $Pd_{nanocube}@PdPt_{nanodendrites}$ yolk-shell or the PdPt nanocage is supported on graphene, a carbon nanotubs, carbon nitride, and/or a MXene.

In alternative embodiments, the the $Pd_{nanocube}@PdPt_{nanodendrites}$ yolk-shells or hollow PdPt nanocages detect CO or $H_2S$.

Examples

Experimental and Methods
Materials $Na_2PdCl_4$, $K_2PtCl_4$, L-ascorbic acid (AA), pluronic F127 (PEO100PP065PEO100), tetraethylorthosilicate (TEOS) and 3-aminopropyltrimethoxysilane (APTMS) were purchased from Sigma-Aldrich Chemie GmbH (Munich, Germany). Isopropanol (98%), $NH_4OH$ (25%), and hydrofluoric acid (HF 25%) were obtained from Beijing Chemical Reagent (Beijing, China). Commercial Pt/C catalyst (20 wt % Pt) was ordered from Alfa Aesar Co.

Synthesis of Pd Nanocubes

Pd nanocubes were typically prepared by mixing an aqueous solution containing 2 mL of 20 mM $Na_2PdCl_4$ and 0.2 mL of (0.34 M) pluronic F127 followed by the addition of 2 mL ascorbic acid (AA, 0.1 M) under sonication for 2 h. The resultant solution was centrifuged at 10,000 rpm for 20 min and washed with $H_2O$ for 3 cycles. The Pd nanoparticles colloids were dissolved in 44 mL $H_2O$ for additional use. The obtained sample is denoted as Pdnanocube.

Synthesis of $Pd_{nanocube}@SiO_2$ $Pd@SiO_2$ nanoparticles were synthesized by mixing 4 mL of Pd nanoparticles with 50 mL isopropanol and 0.5 mL of $NH_4OH$ followed by the addition of 200 µL of TEOS. The solution was stirred at 30° C. for 12 h. The final products were purified by centrifugation at 7000 rpm for 10 min, washed with ethanol/water, and then dried in a vacuum oven at 50° C. for 2 h.

Synthesis of Pd@PdPt Yolk-Shell

APTMS-modified $Pd@SiO_2$ nanoparticles were formed by mixing 50 mg $Pd@SiO_2$ nanoparticles in a 20 mL isopropanol and 300 µL APTMS with refluxing for 12 h at 353 k. The products were collected by centrifugation at 7000 rpm, washed with ethanol/water 3 times to remove the excess APTMS, and then dried at 313 k for 24 h. $Pd@SiO_2@PdPt$ nanoparticles were prepared by mixing 10 mg APTMS-modified $Pd@SiO_2$, 3 mL of $K_2PtCl_4$ (10 mM), 3 mL of $Na_2PdCl_4$ (10 mM), and 40 mg of F127 and then 1 mL of AA (0.2 M) was rapidly added under sonication at 313 k for 4 h. The resulting solution was centrifuged at 6000 rpm, washed with $H_2O$ 3 times, and then resuspended in 20 mL HF (10 wt %) for 12 h. Finally, the Pd@PdPt yolk-shell was collected by centrifugation at 3000 rpm for 10 minutes and washed with $H_2O$ 5 times.

Synthesis of PdPt Nanocages

The stöber method was used to form $SiO_2$ nanoparticles. 50 mL isopropanol and 0.5 mL of NH 4 OH were mixed before adding 200 µL TEOS and the mixture was stirred at 30° C. for 12 h. Then, $SiO_2$ nanoparticles were purified by centrifugation at 7000 rpm for 10 min, washed with ethanol/water, and dried in a vacuum oven at 50° C. for 2 h. APTMS-modified $SiO_2$ nanoparticles were formed by mixing 50 mg $SiO_2$ nanoparticles in 20 mL isopropanol and 300 µL APTMS under refluxing for 12 h at 353 k. The products were collected by centrifugation at 7000 rpm, washed with ethanol/water 3 times, and then dried at 50° C. for 24 h. $SiO_2@PdPt$ nanoparticles were prepared by mixing 10 mg APTMS-modified $Pd@SiO_2$, 3 mL of $K_2PtCl4$ (10 mM), 3 mL of $Na_2PdCl_4$ (10 mM), and 40 mg of F127 and then 1 mL of AA (0.2 M) was rapidly added under sonication at 313 k for 4 h. The resulting solution was centrifuged at 6000 rpm, washed wicth $H_2O$ 3 times, and then resuspended in 20 mL HF (10 wt %) for 12 h. Finally, the PdPt nanocage was collected by centrifugation at 3000 rpm for 10 minutes and washed with $H_2O$ 5 times.

Sensor Fabrication

SiO$_2$/Si glass slide substrates (1×1.5 cm$^2$) were washed with acetone and deionized water in an ultrasonic bath and dried. Subsequently, a pair of parallel thin Cu electrodes, 3 mm apart, were deposited on each substrate. The wires were fixed to the electrodes using silver paste. An aqueous solution of Pd@PdPt yolk-shell nanoarchitectonics or PdPt nanocages or (10 μL, 1 mg/mL) were deposited on the electrodes and dried at room temperature to obtain a thin homogenous layer. Next, the fabricated sensor was carefully fixed inside a test chamber before the H$_2$ gas detection measurements.

Materials Characterization

The morphology and composition of the as-synthesized materials were investigated with a scanning electron microscope (SEM, Hitachi S-4800, Hitachi, Tokyo, Japan) and a transmission electron microscope ((TEM), TecnaiG220, FEI, Hillsboro, OR, USA) equipped with a high-resolution TEM (HRTEM), energy dispersive spectrometer (EDS), Energy Dispersive X-ray (EDX), and high-angle annular dark-field scanning TEM (HAADF-STEM). The X diffraction (PXRD) patterns were recorded on the XRD diffractometer (X'Pert-Pro MPD, PANalytical Co., Almelo, Netherlands). The elements analysis was determined using an elemental analyzer (Vario EL cube, Germany. The nitrogen physisorption isotherms were tested on a Quanta chrome Instrument Corporation Autosorb-1 analyzer (Quanta chrome Instrument Corporation, Boynton Beach, FL, USA). The X-ray photoelectron spectroscopy (XPS) spectra were measured on a Kratos Axis (Ultra DLD XPS Kratos, Manchester, UK).

H$_2$ Sensing Measurements

For the electrical characterization, charge transport was examined by DC current-voltage measurements (I(V)) using an SMU-236 source measurement unit (Keithley Instruments). Ac measurements were conducted using a gain-phase analyzer (Solartron 1260A) where the electrical impedance (Z) was resolved into real part (Z') and imaginary part (Z") with Z=Z'+Z". For gas response measurements, hydrogen gas was mixed with air using mass flow meters (Bronkhorst). The gas was then presented inside the test chamber. The SMU-236 was utilized to identify the gas response by measuring the variation of electrical current while applying a constant voltage of 1 V across the sample. All electrical measurements were performed inside a Teflon test chamber with a controlled temperature.

Results

Figure 2C:
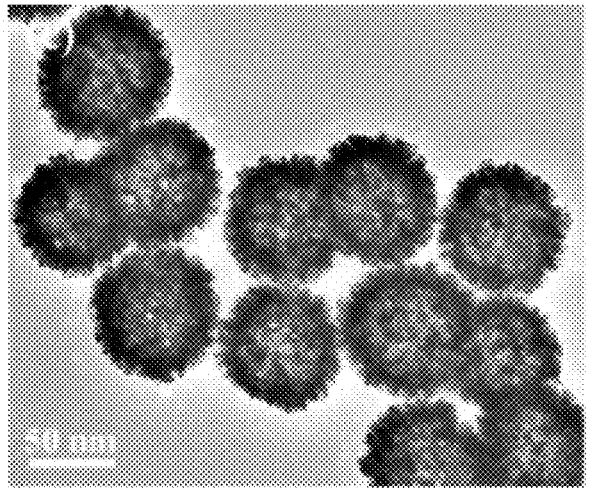
FIG. 2C is a TEM image of the $Pd_{nanocube}$@$PdPt_{nanodendrites}$ yolk-shell.
Figure 2D:
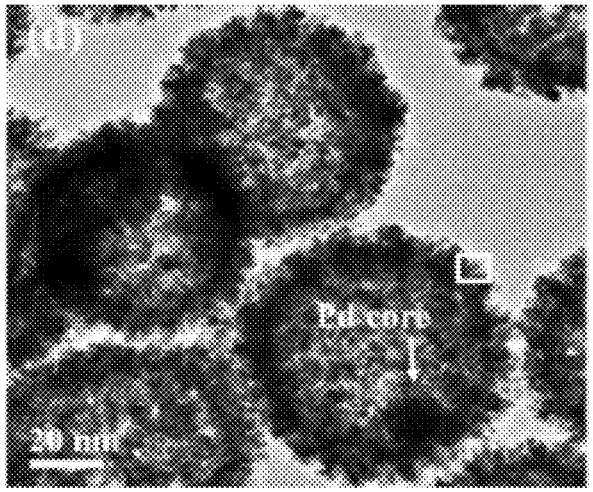
FIG. 2D is a TEM image of the $Pd_{nanocube}$@$PdPt_{nanodendrites}$ yolk-shell. The arrow is pointing to the Pd core.
Figure 2E:
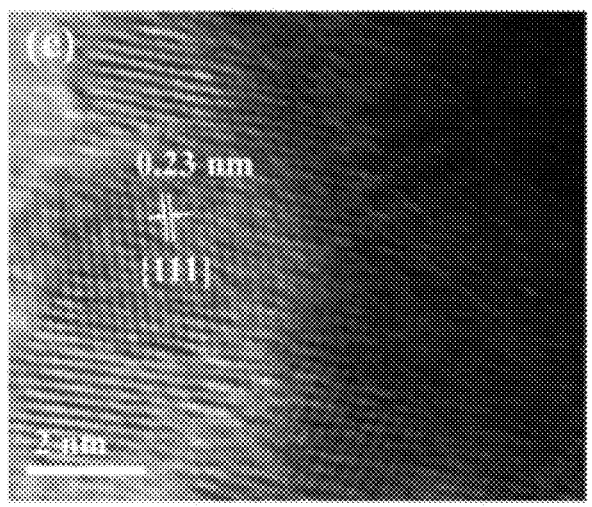
FIG. 2E is an HRTEM image of the boxed area in the shell in FIG. 2D.
Figure 2F:
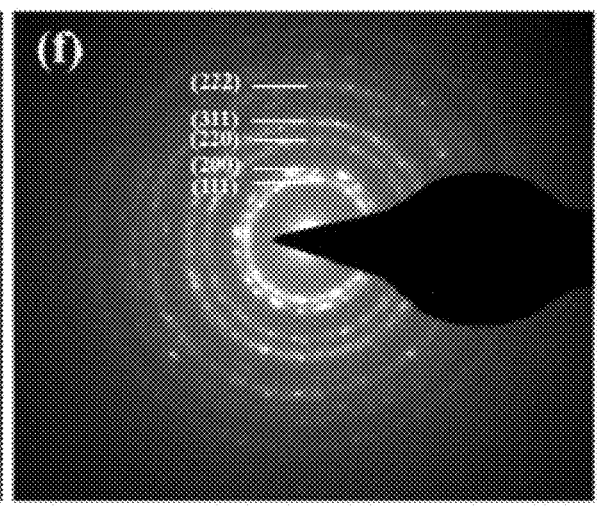
FIG. 2F is a SAED image of the $Pd_{nanocube}$@$PdPt_{nanodendrites}$ yolk-shell.

FIG. 1 shows the controlled fabrication of Pd@PdPt yolk-shell nanoarchitectonics. After the formation of Pd nanocubes, the steps include, 1) silanization to coat the cube with a SiO$_2$ layer to form Pdnanocube@SiO$_2$; 2) self-assembly of PdPt nanodendrites to form Pdnanocube@SiO$_2$@PdPt; and, 3) selective chemical etching of the SiO$_2$ layer. FIG. 2A is a TEM image of the Pd nanocubes with an average diameter of (10 nm±2) prepared by the chemical reduction of Na$_2$PdCl$_4$ with ascorbic acid in the presence of the nonionic surfactant F127 at room temperature under ultrasonic irradiation. The Pd nanocubes were coated with a SiO$_2$ layer via the salinization process using the stöber method to afford Pd@SiO$_2$ nanoparticles (TEM image is shown in FIG. 2B). The resultant Pd@SiO$_2$ nanoparticles were used as starting seeds for supporting growth of PdPt nanodendrites via the co-reduction of K$_2$PtCl$_4$ and Na$_2$PdCl$_4$ by ascorbic acid in the presence of F127 at room temperature followed by selective chemical etching of SiO$_2$ to form Pd$_{nanocube}$@PdPt$_{nanodendrites}$ yolk-shell shape with a diameter of 80±5 nm (TEM image is shown in FIG. 2C). The Pd$_{nanocube}$@PdPt$_{nanodendrites}$ exhibited a well-defined yolk-shell nanostructure with Pd nanocubes in the core and PdPt nanodendrites in the shell with multiple branches with an average thickness of 30±2 and a hierarchal porosity in the core and shell areas (TEM image in FIG. 2D). The HRTEM image (FIG. 2E) of the PdPt nanodendrites only displayed the homogenous lattice fringes with an interlayer spacing of 0.23 nm assigned to {111} facet of Pt. The selected area diffraction patterns (SAED) of Pd$_{nanocube}$@PdPt$_{nanodendrites}$ yolk-shell showed the typical diffraction rings associated to the typical {111}, {200}, {220}, {311}, and {222} facets of face central cube (fcc) lattice structure of Pt (FIG. 2F).

Figure 3A:
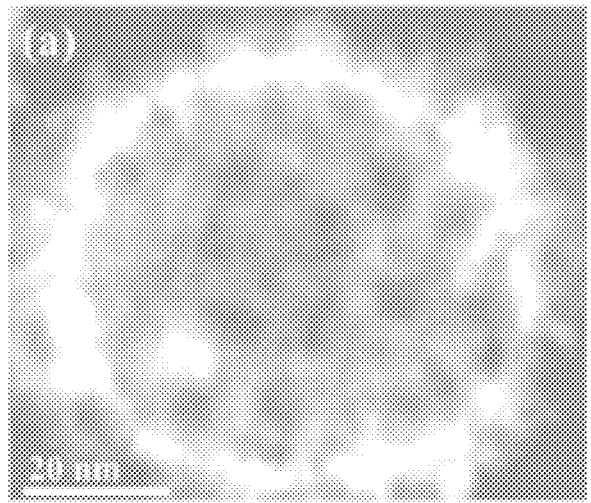
FIG. 3A is an HAADF-STEM image of the $Pd_{nanocube}$@$PdPt_{nanodendrites}$ yolk-shell and its EDS elemental mapping analysis.
Figure 3B:
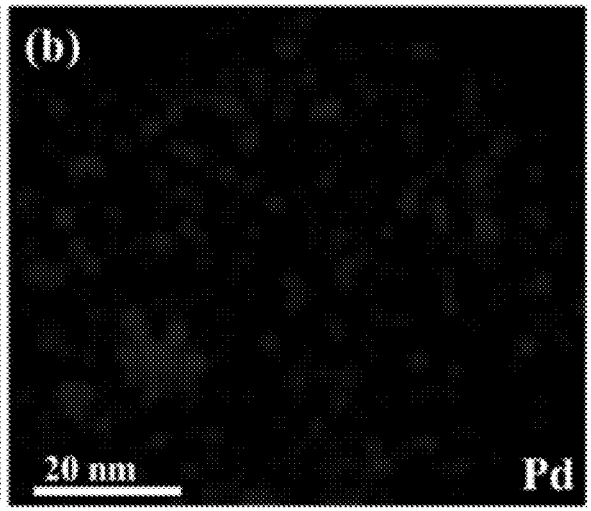
FIG. 3B is an HAADF-STEM image of the $Pd_{nanocube}$@$PdPt_{nanodendrites}$ yolk-shell and its EDS elemental mapping analysis for Pd in the core.
Figure 3C:
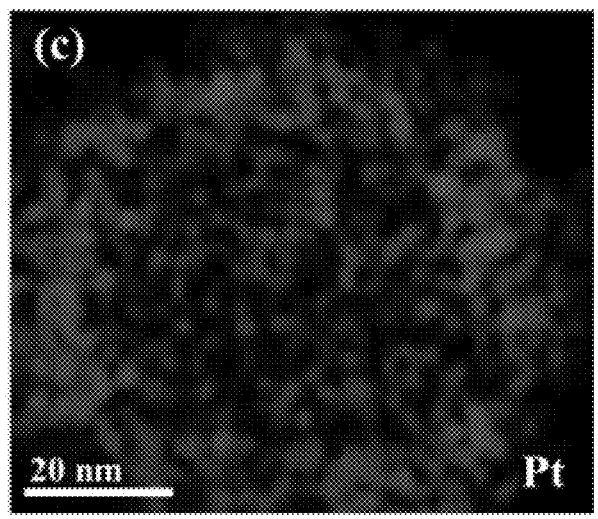
FIG. 3C is an HAADF-STEM image of the $Pd_{nanocube}$@$PdPt_{nanodendrites}$ yolk-shell and its EDS elemental mapping analysis for Pt.
Figure 3D:
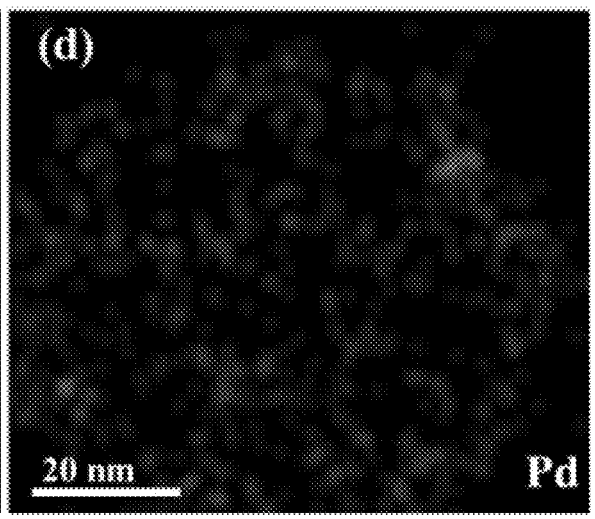
FIG. 3D is an HAADF-STEM image of the $Pd_{nanocube}$@$PdPt_{nanodendrites}$ yolk-shell and its EDS elemental mapping analysis for Pd in the shell area.

The HAADF-STEM image (FIG. 3A) the of Pd$_{nanocube}$@PdPt$_{nanodendrites}$ showed spatial yolk-shell nanoarchitectonics with Pd nanocube in the core and Pd$_{nanocube}$@PdPt$_{nanodendrites}$ in the shell area as well various mesoporous (≤2 pore) and macrospores (≥10 nm). The EDS elemental mapping analysis showed the homogenous distribution of PdPt in the shell area and Pd in the core (FIG. 3B-FIG. 3D). The atomic ratio content of Pd to Pt in the Pd$_{nanocube}$@PdPt$_{nanodendrites}$ was about 3 to 2, respectively. The EDX analysis also showed the presence of Pd and Pt with an atomic content of 3 and 2.5, respectively, in the Pd$_{nanocube}$@PdPt$_{nanodendrites}$.

Figure 4:
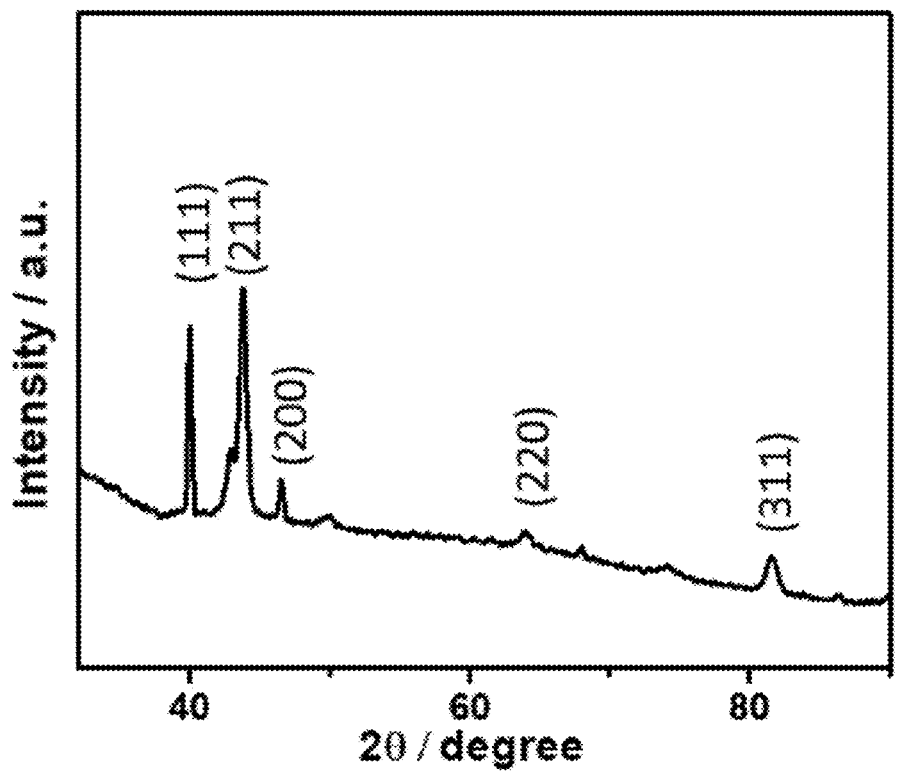
FIG. 4 is an XRD spectrum of the $Pd_{nanocube}$@$PdPt_{nanodendrites}$ yolk-shell.
Figure 5A:
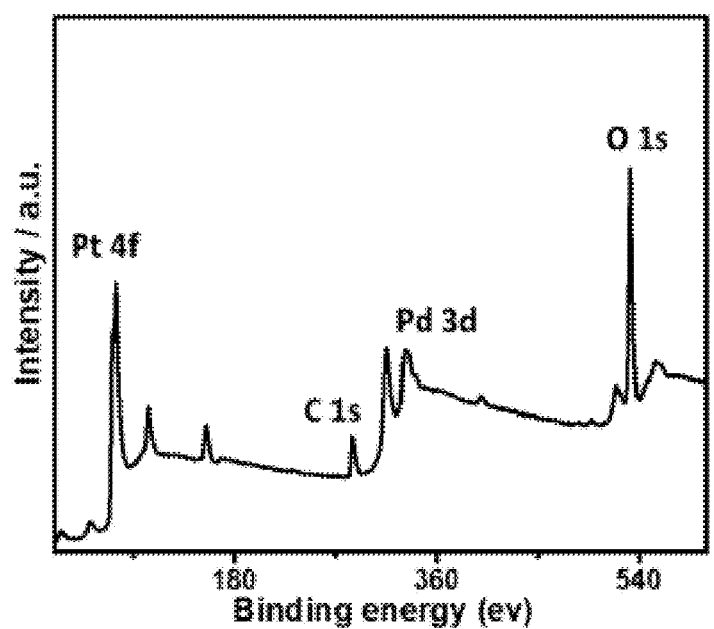
FIG. 5A is an XPS survey of the $Pd_{nanocube}$@$PdPt_{nanodendrites}$ yolk-shell.
Figure 5B:
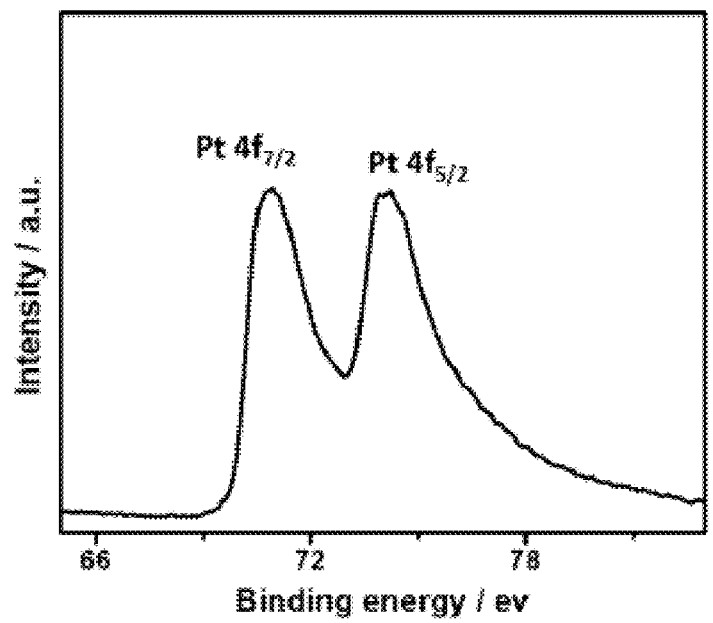
FIG. 5B is a high-resolution XPS spectrum of Pt of the $Pd_{nanocube}$@$PdPt_{nanodendrites}$ yolk-shell.
Figure 5C:
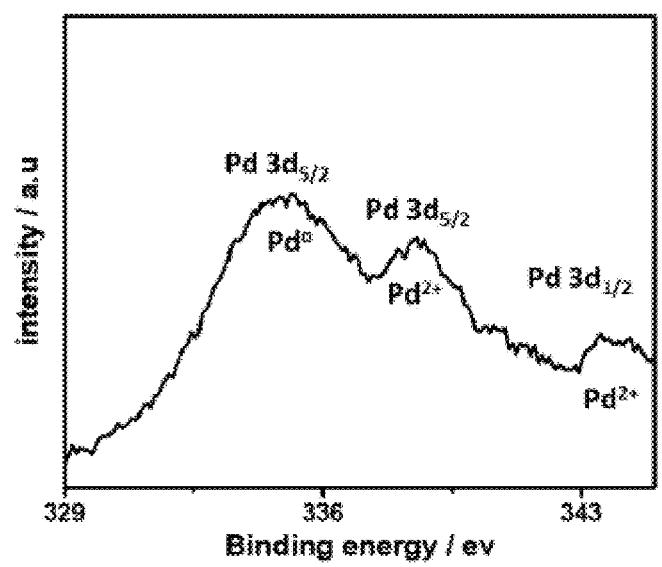
FIG. 5C is a high-resolution XPS spectrum of Pd of the $Pd_{nanocube}$@$PdPt_{nanodendrites}$ yolk-shell.

The XRD analysis of the Pd$_{nanocube}$@PdPt$_{nanodendrites}$ showed the {111}, {211}, {200}, {220}, and {311} facets of fcc Pt, due to the great lattice synergism between Pd and Pt (FIG. 4) consistent with the SAED result. The XPS analysis confirmed the electronic structure and surface composition. The XPS survey showed two main Pt 4f and Pd 3d spectra (FIG. 5A). The high resolution XPS spectra of Pt 4f showed Pt4f7/2 at 70.8 and Pt4f5/2 at 74.2 eV (FIG. 5B) in addition to Pd 4f spectra of Pd 3d5/2 at 335.0 V for Pd$^0$ metal and Pd 3d5/2 at 337.2 eV for Pd$^{2+}$ with a slight Pd 3d3/2 at 342.8 eV for Pd$^{2+}$ (FIG. 5C). The surface atomic ratio of Pt/Pd was about 55/45.

Figure 6A:
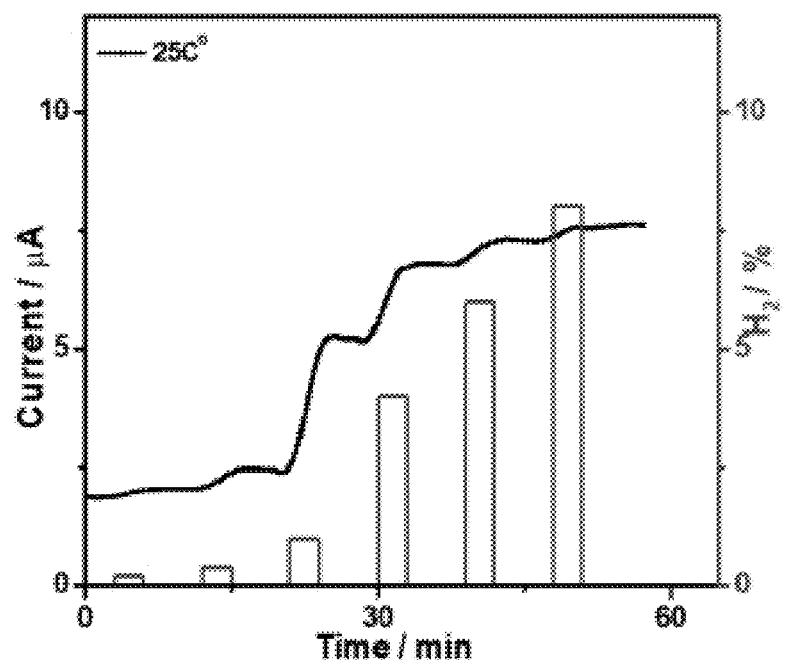
FIG. 6A is a graph showing the electrical current signal of the $H_2$ gas response on the $Pd_{nanocube}@PdPt_{nanodendrites}$ yolk-shell as a function of time and $H_2$ concentration at 25° C.
Figure 6B:
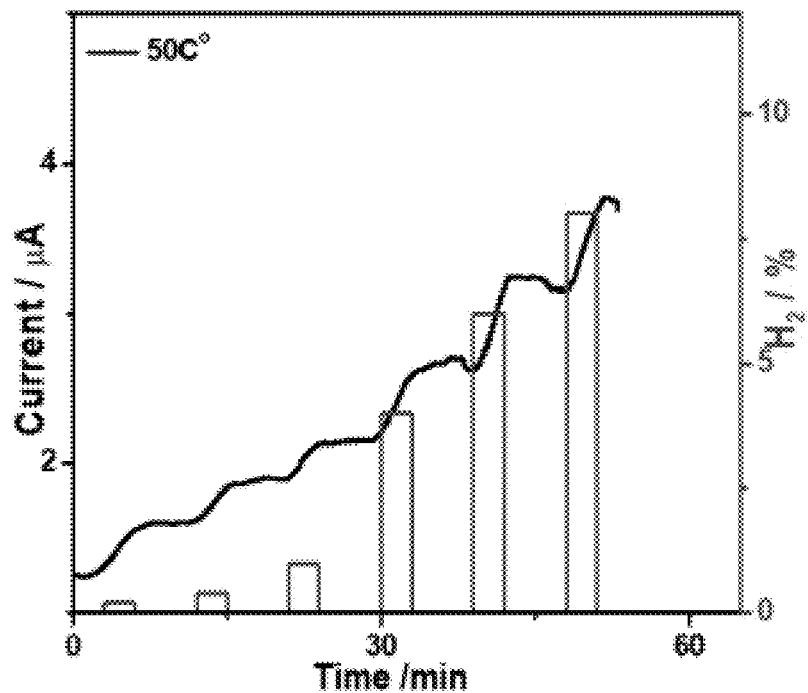
FIG. 6B is a graph showing the electrical current signal of the $H_2$ gas response on the $Pd_{nanocube}@PdPt_{nanodendrites}$ yolk-shell as a function of time and $H_2$ concentration at 50° C.

FIG. 6A and FIG. 6B show the electrical current signal of the H$_2$ gas response on Pd$_{nanocube}$@PdPt$_{nanodendrites}$ yolk-shell as a function of time and H$_2$ concentration at room temperature (25° C.) (FIG. 6A) and at 50° C. (FIG. 6B). The Pd$_{nanocube}$@PdPt$_{nanodendrites}$ yolk-shell promptly responses to H$_2$ gas with a typical stair shape at both 25° C. and 50° C. (FIG. 6A and FIG. 6B). Notably, the high H$_2$ adsorption capacity of PdPt at room temperature expanded the crystal size and decreased the contacting area between Pd and Pt crystallites, subsequently enhancing the electrical current. Meanwhile, the response to H$_2$ gas increased from 0 min to 50 min with increasing H$_2$ concertation from 0.1 v % to 8 v % (FIG. 6A-FIG. 6B). The H$_2$ response at 50° C. (FIG. 6B) was higher than that at 25° C. (FIG. 6A). The steady-state stair shape of the H$_2$ response without a significant recovery (no H$_2$ was released and the resistance decreased) on Pd$_{nanocube}$@PdPt$_{nanodendrites}$ yolk-shell is indirect evidence of its high H$_2$ adsorption capacity at 50° C. and at 25° C.

Figure 7A:
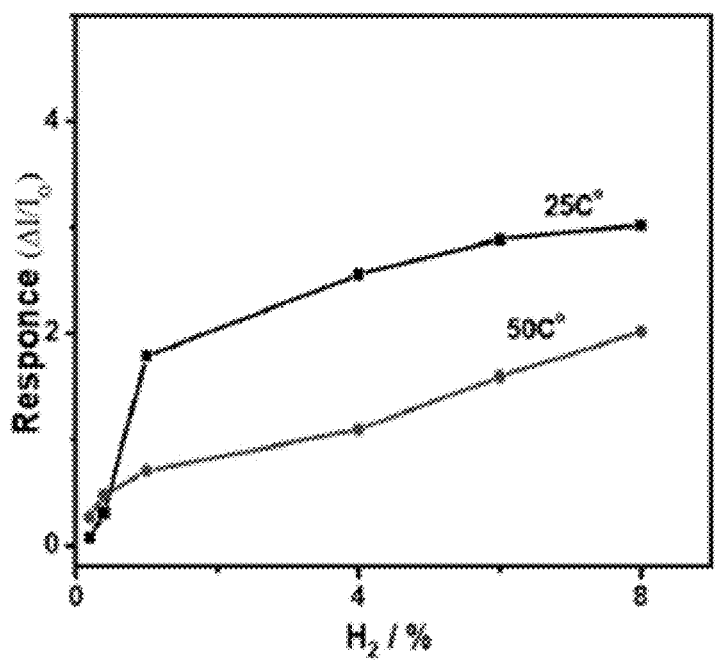
FIG. 7A is a graph showing the $H_2$ gas response defined as $\Delta I/I_{min}$ as a function of $H_2$ concentration at 25° C. and 50° C. on the $Pd_{nanocube}@PdPt_{nanodendrites}$ yolk-shell.
Figure 7B:
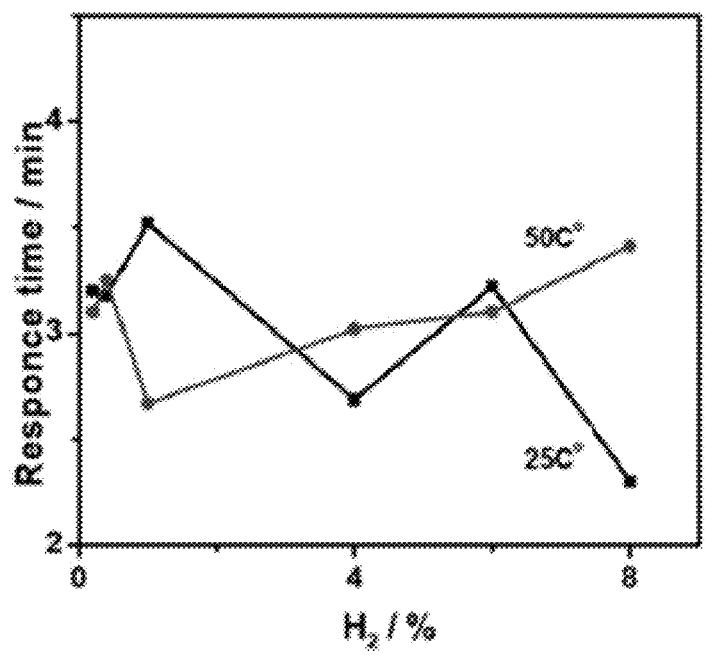
FIG. 7B is a graph showing the $H_2$ gas response time as a function of $H_2$ concentration at 25° C. and 50° C. on the $Pd_{nanocube}@PdPt_{nanodendrites}$ yolk-shell.

FIG. 7A displays the H$_2$ response defined as $\Delta I/I_{min}$ where $I_{min}$ is the minimum current of each step and $\Delta I$ is the step height. The response increased when the H$_2$ concentration increased from 0.1 v % to 8 v % to reach a maximum response at 8 v % (FIG. 7A). The $\Delta I/I_{min}$ H$_2$ response at 25° C. was significantly higher than that at 50° C. (FIG. 7A). FIG. 7B shows the dependence of the sensor response time (defined as the time required for the electrical current to increase from the minimum value to 90% of its maximum) on H$_2$ gas concentration. The H$_2$ response time changes up-and-down substantially with increasing H$_2$ concentration, with minimum response time of 2.2 min at 8 v % H$_2$ (FIG. 7B).

FIG. 8 shows the impedance measurements carried out before and after $H_2$ gas detection on the $Pd_{nanocube}$@$PdPt_{nanodendrites}$ yolk-shell at 25° C. and at 50° C. All measurements showed the typical semicircle shape for the DC resistance that can be simulated by a pair of parallel capacitors and resistors. The DC resistance decreased from 3.4 MΩ to 0.16 MΩ at 25° C. after $H_2$ detection, which is consistent with response measurements due to hydrogen adsorption and increasing charge transfer after exposure to $H_2$ (FIG. 8A). Likewise, the DC resistance decreased from 0.9 MΩ to 0.14 MΩ at 50° C. after $H_2$ detection (FIG. 8B).

Figure 8A:
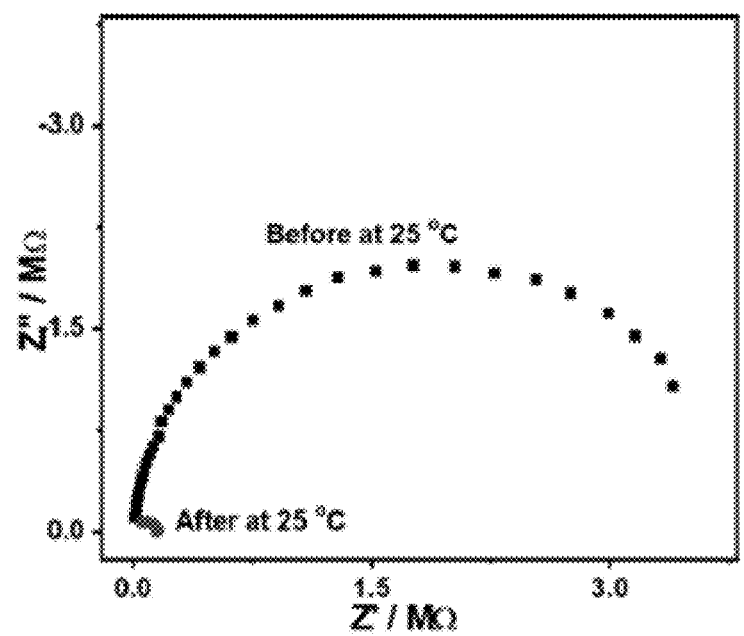
FIG. 8A is the electrical impedance measurements at 25° C. before and after the $H_2$ gas response on the $Pd_{nanocube}@PdPt_{nanodendrites}$ yolk-shell.
Figure 8B:
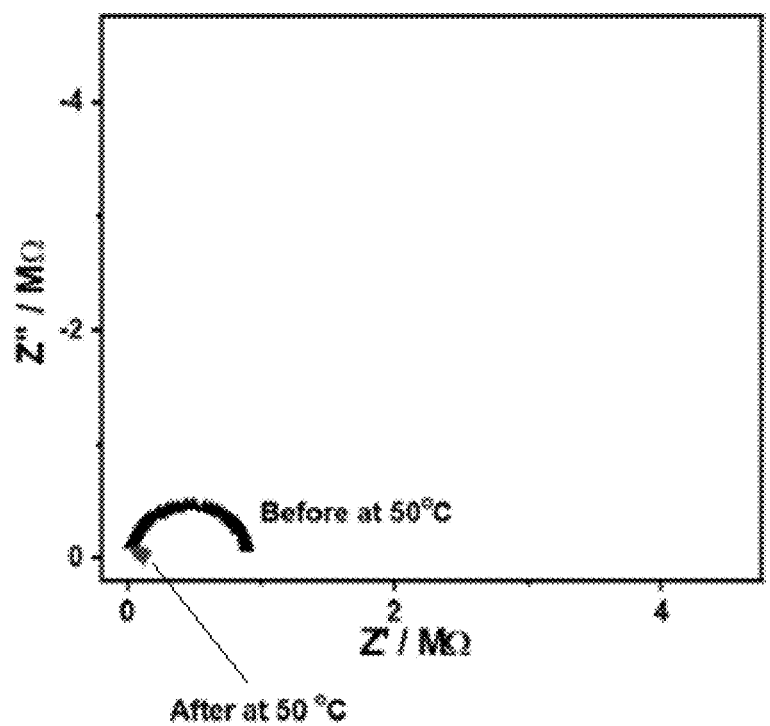
FIG. 8B is the electrical impedance measurements at 50° C. before and after the $H_2$ gas response on the $Pd_{nanocube}@PdPt_{nanodendrites}$ yolk-shell.
Figure 8C:
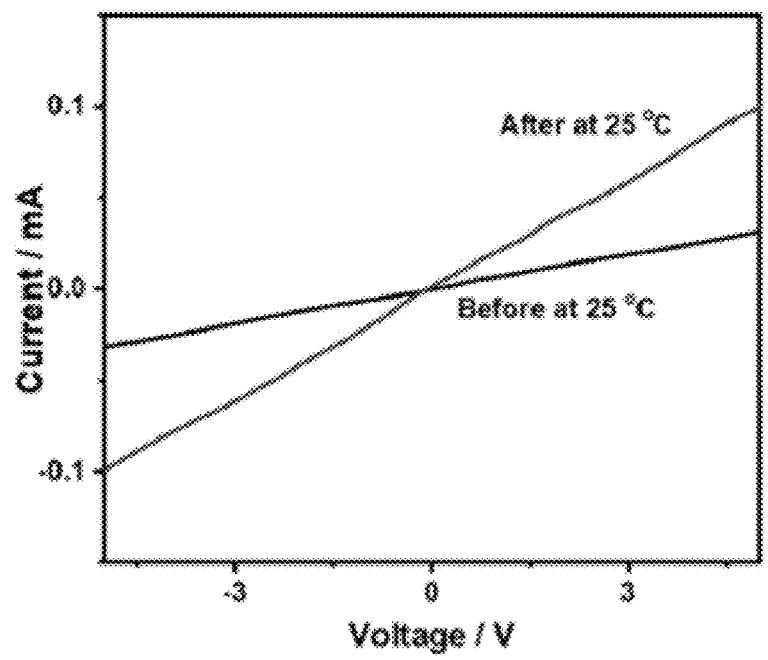
FIG. 8C shows the current-voltage I(V) measurements at 25° C. before and after the $H_2$ gas response on the $Pd_{nanocube}@PdPt_{nanodendrites}$ yolk-shell.
Figure 8D:
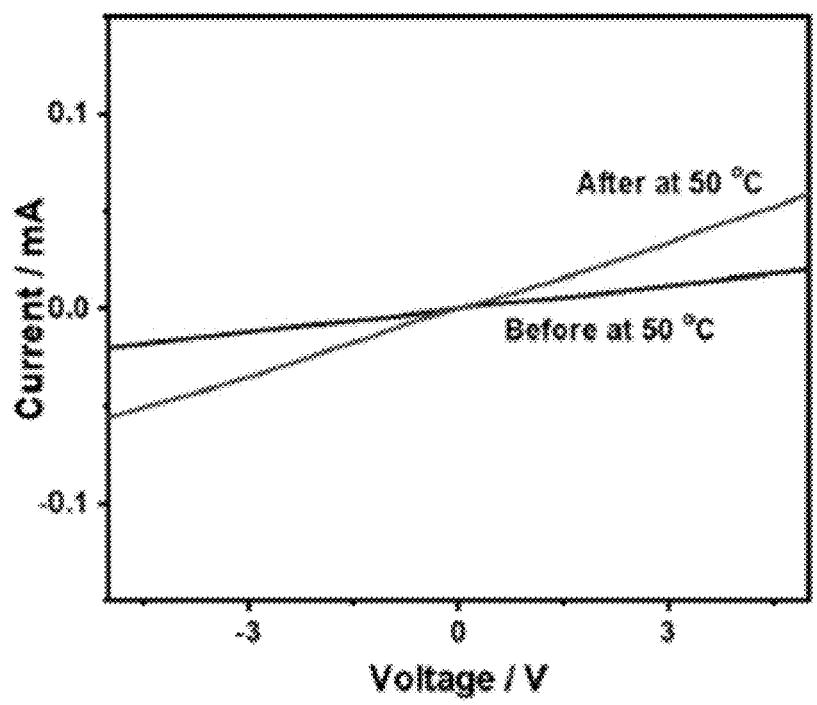
FIG. 8D shows the current-voltage I(V) measurements at 50° C. before and after the $H_2$ gas response on the $Pd_{nanocube}@PdPt_{nanodendrites}$ yolk-shell.

The $H_2$ gas response was further investigated using the electrical charge transport measurements (FIG. 8C-FIG. 8D) before and after $H_2$ detection. The current vs. potential I(V) measurements displayed a linear relationship at 25° C. (FIG. 8C) and at 50° C. (FIG. 8D). However, after $H_2$ detection, the I(V) kept its linear relationship behavior, but increased by more than 2 times at 25° C. and at 50° C. due to a decrease in the resistance after exposure to $H_2$ gas.

Figure 9:
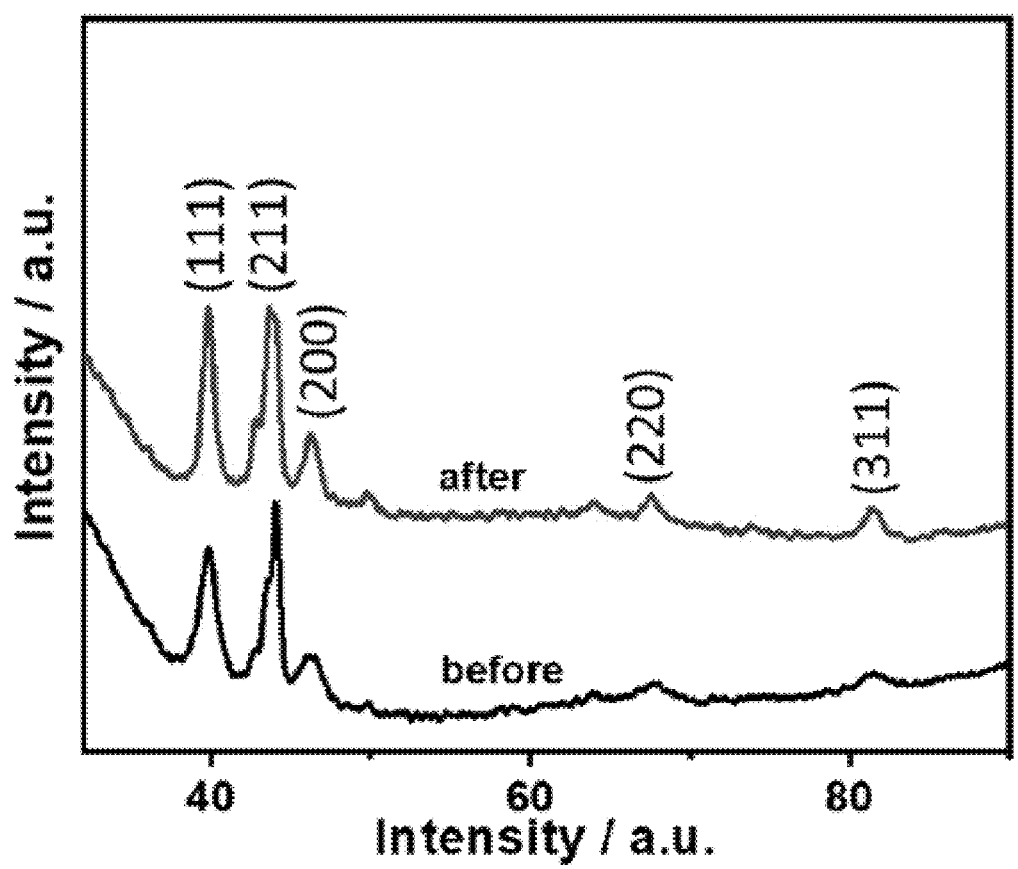
FIG. 9 is the XRD spectrum of the $Pd_{nanocube}@PdPt_{nanodendrites}$ yolk-shell before and after the $H_2$ gas response at 50° C.
Figure 10A:
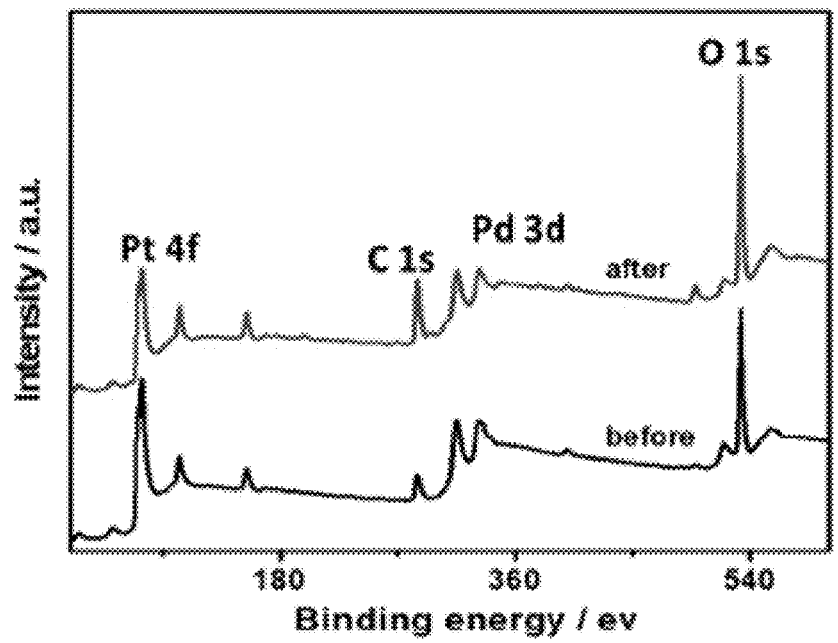
FIG. 10A is an XPS survey of the $Pd_{nanocube}@PdPt_{nanodendrites}$ yolk-shell before and after the $H_2$ gas response at 50° C.
Figure 10B:
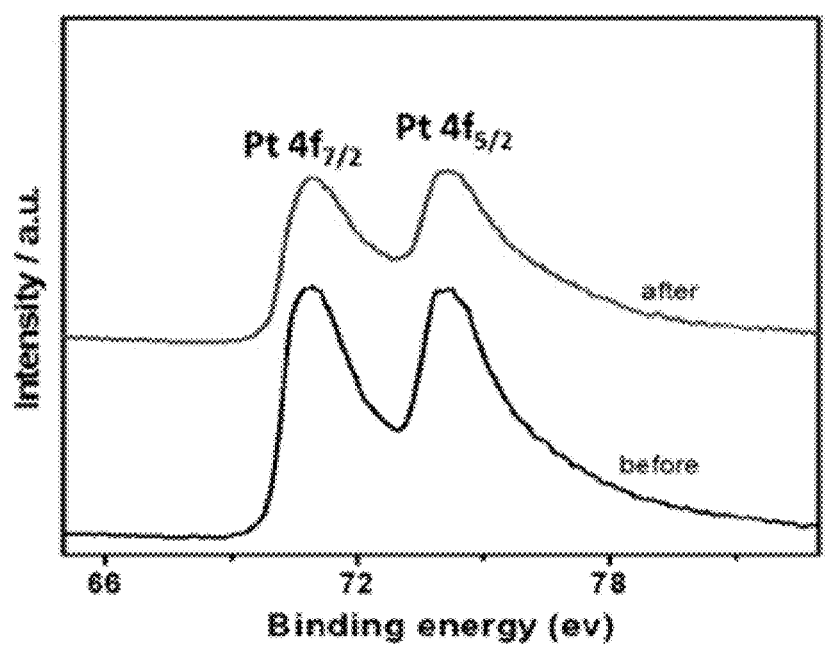
FIG. 10B is a high-resolution XPS spectrum of Pt of the $Pd_{nanocube}@PdPt_{nanodendrites}$ yolk-shell before and after the $H_2$ gas response at 50° C.
Figure 10C:
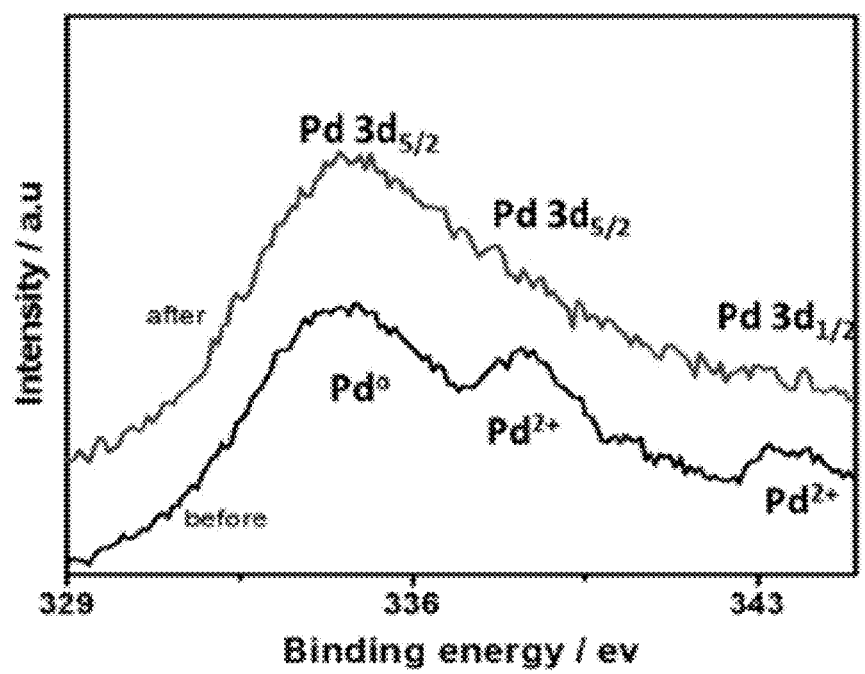
FIG. 10C is a high-resolution XPS spectrum of Pd of the $Pd_{nanocube}@PdPt_{nanodendrites}$ yolk-shell before and after the $H_2$ gas response at 50° C.

The XRD and XPS analysis were carried out for the $Pd_{nanocube}$@$PdPt_{nanodendrites}$ yolk-shell after $H_2$ detection measurements at 50° C. The results showed that the fcc crystal structure with the same XRD diffraction patterns without any significant changes was maintained except for a slight broadening in the half-width of the peaks (FIG. 9). Meanwhile, the XPS surveys and high-resolution analysis also showed that the $Pd_{nanocube}$@$PdPt_{nanodendrites}$ yolk-shell maintained its electronic structure and surface composition without any significant change (FIG. 10A, FIG. 10B, and FIG. 10C). These results clearly indicate the absence of any kind of physical distortion for $Pd_{nanocube}$@$PdPt_{nanodendrites}$ yolk-shell after $H_2$ detection even at high $H_2$ concentrations of 6%.

FIG. 11 shows the controlled fabrication of PdPt nanocages formed via self-assembly of PdPt nanodendrites over $SiO_2$ nanoparticles to form $SiO_2$@PdPt followed by selective chemical etching of $SiO_2$ to yield PdPt nanocages with a dendritic shell. FIG. 12A shows the TEM image of PdPt nanocages with a dendritic shell formed using the $SiO_2$ nanoparticles as starting seeds for the self-assembly growth of PdPt nanodendrites via the co-reduction of K2PtCl4 and Na2PdCl4 by ascorbic acid in the presence of F 127 at room temperature followed by selective chemical etching of $SiO_2$ to form PdPt nanocages. The average diameter of thus obtained PdPt nanocages was about 80±5 nm, whereas the average thickness of the spatial dendritic shell is PdPt nanodendrites was about 30±2 in addition to hierarchal porosity in the core and shell areas (FIG. 12B). The HRTEM images of the PdPt nanodendrites only displayed the homogenous lattice fringes with an interlayer spacing of 0.23 nm assigned to {111} facet of Pt (FIG. 12C). The SAED PdPt nanocage showed the typical diffraction rings associated to the typical {111}, {200}, {220}, {311}, and {222} facets fcc lattice structure of Pt (FIG. 12D).

The HAADF-STEM image of PdPt nanocages displayed its spatial cage-like shape with a dendritic shell along with mesoporous ≤2 pore and macrospores ≥10 nm (FIG. 13A). The EDS elemental mapping analysis showed the homogenous distribution of Pd and Pt in the shell area (FIG. 13B-FIG. 13C). The atomic ratio content of Pd to Pt was about 3 to 2, respectively. The EDX analysis also exhibited the presence of Pd and Pt with an atomic content of 3 and 2.5, respectively, in the as-synthesized of PdPt nanocages.

Figure 15A:
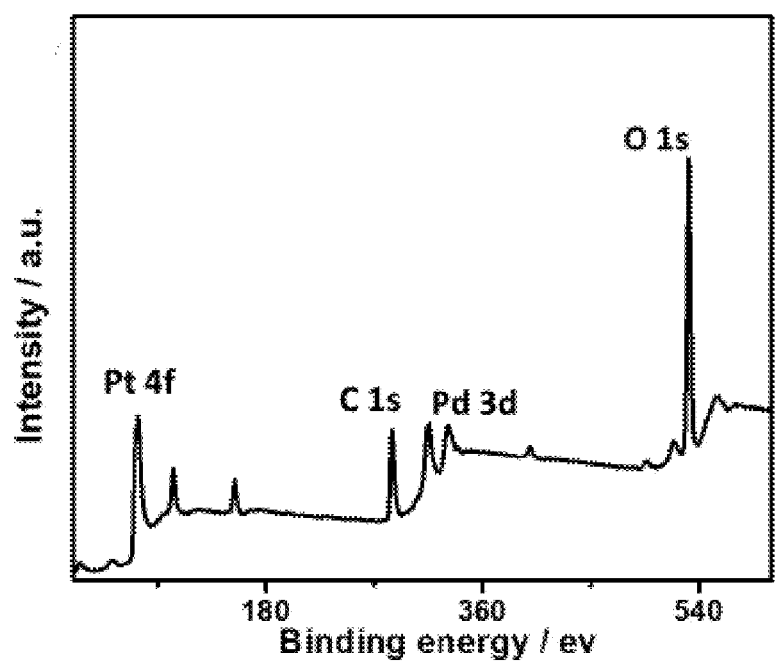
FIG. 15A is an XPS survey of the PdPt nanocages.
Figure 15B:
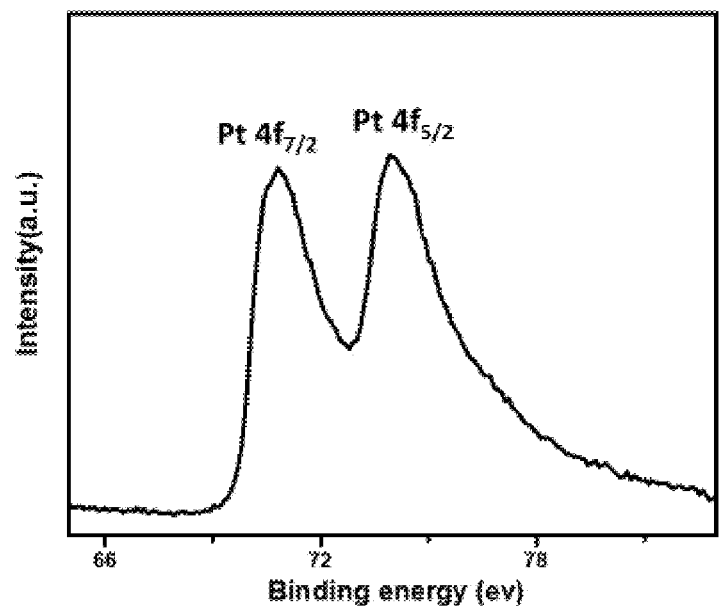
FIG. 15B is a high-resolution XPS spectrum of the Pt of the PdPt nanocages.
Figure 15C:
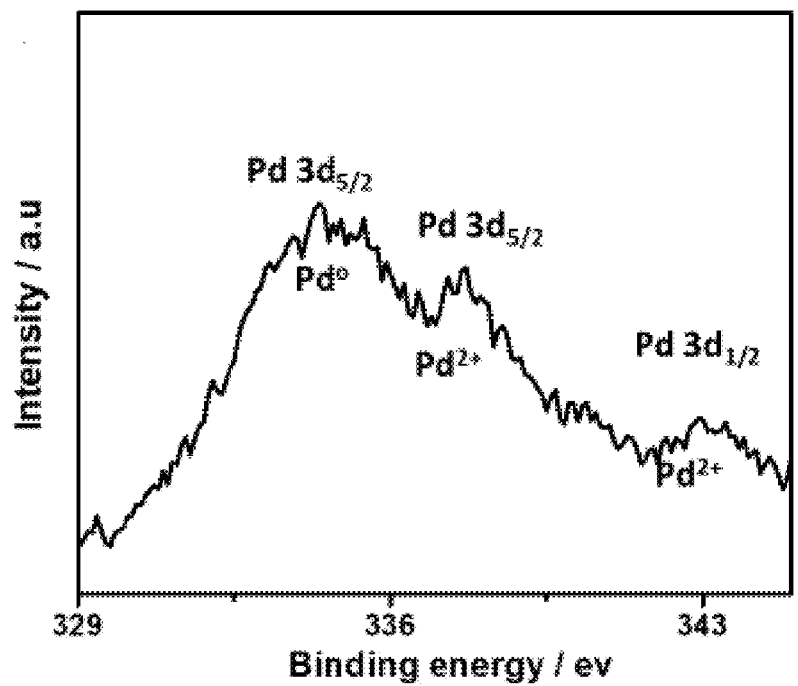
FIG. 15C is a high-resolution XPS spectrum of the Pd of the PdPt nanocages.

The XRD analysis of PdPt nanocages showed the {111}, {211}, {200}, {220}, and {311} facets of fcc Pt, due to the great lattice synergism between Pd and Pt (FIG. 14) in line with the SAED result. The XPS survey revealed the two main Pt 4f and Pd 3d spectra (FIG. The high resolution XPS spectra of Pt 4f showed Pt4f7/2 at 70.4 and and Pt4f5/2 at 74.5 eV (FIG. 15B) in addition to Pd 4f spectra of Pd 3d5/2 at 334.7 V for $Pd^0$ metal and Pd 3d5/2 at 337.5 eV for $Pd^{2+}$ with a slight Pd 3d3/2 at 342.6 eV for $Pd^{2+}$ (FIG. 15C). The surface atomic ratios of Pt/Pd are about 56/44, correspondingly.

Figure 16A:
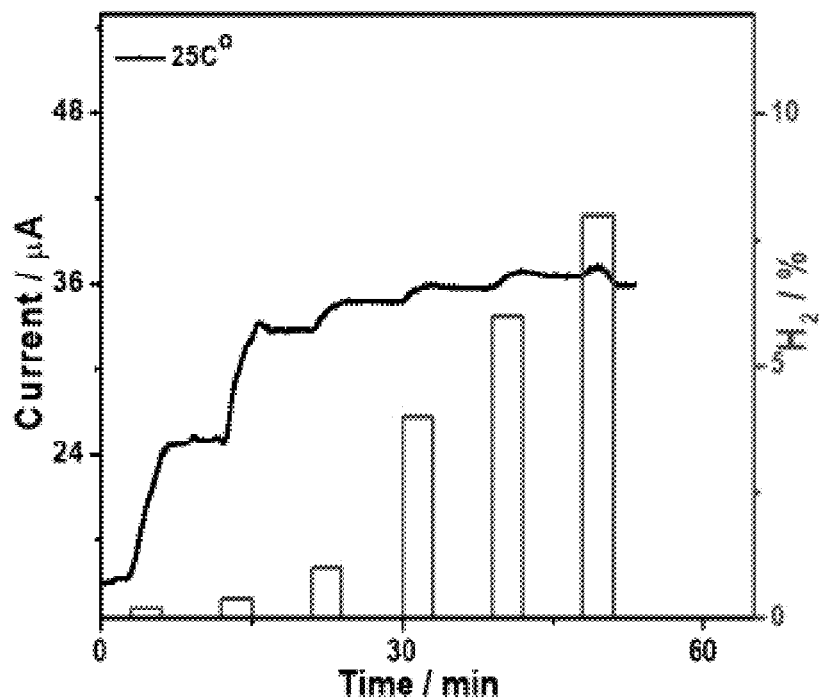
FIG. 16A is a graph of the electrical current signal of the $H_2$ gas response on the PdPt nanocages as a function of time and $H_2$ concentration at 25° C.
Figure 16B:
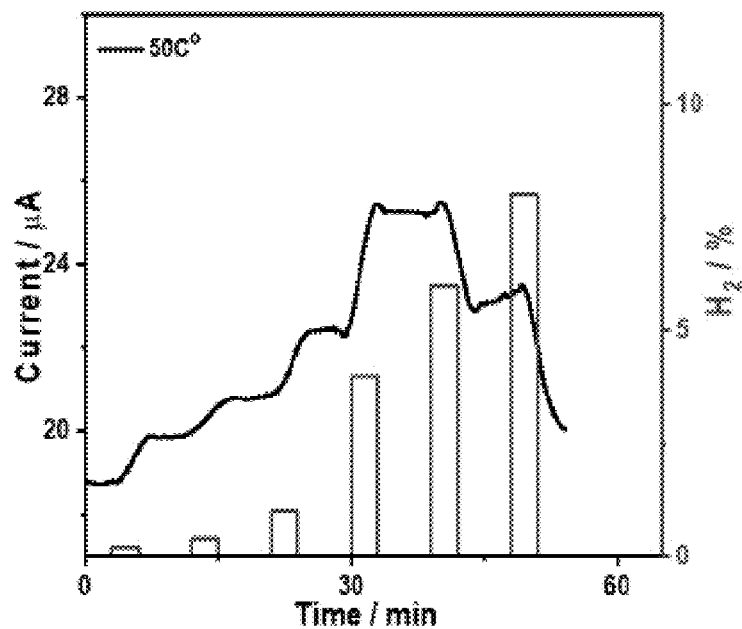
FIG. 16B is a graph of the electrical current signal of the $H_2$ gas response on the PdPt nanocages as a function of time and $H_2$ concentration at 50° C.

FIG. 16A and FIG. 16B show the electrical current signal of $H_2$ gas response on PdPt nanocages as a function of time and $H_2$ concentration at room temperature 25° C. (FIG. 16A) and at 50° C. (FIG. 16B). PdPt nanocages promptly responded to the $H_2$ gas with a typical stair shape at 25° C. and 50° C. along with enhancement the resultant current. The $H_2$ gas response increased with increased $H_2$ concertation from 0.1 v % to 8 v % from min to 50 min at 25° C. (FIG. 16A). The same trend was observed at 50° C. until only 6 v % $H_2$, after which the current decreased significantly (FIG. 16B). This is due to the sudden increase in the temperature at 6 v % $H_2$, which resulted in $H_2$ release and current decrease. The $H_2$ response at 25° C. (FIG. 16A) was higher than that at 50° C. (FIG. 16B). The steady-state stair shape of the $H_2$ response without a significant recovery on PdPt nanocages is indirect evidence its high $H_2$ adsorption capacity at 50° C. and at 25° C.

Figure 17A:
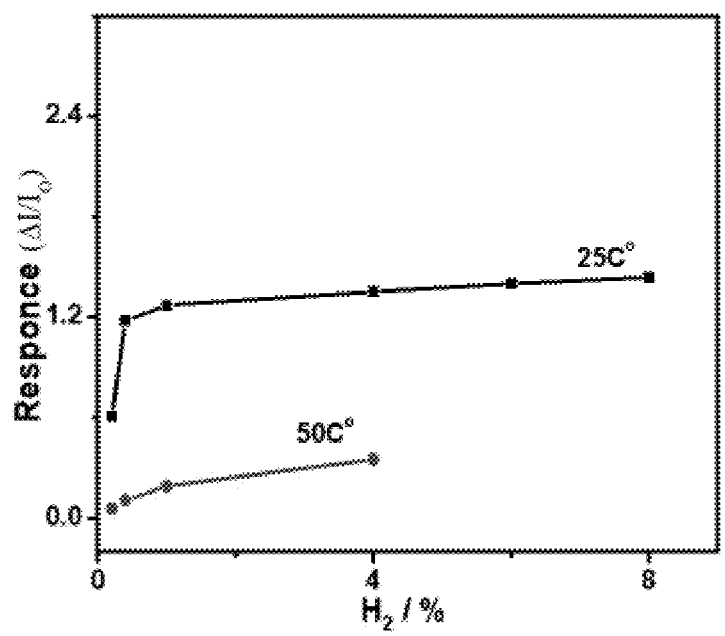
FIG. 17A is a graph showing the $H_2$ gas response defined as $\Delta I/I_{min}$ as a function of $H_2$ concentration at 25° C. and 50° C. on PdPt nanocages.
Figure 17B:
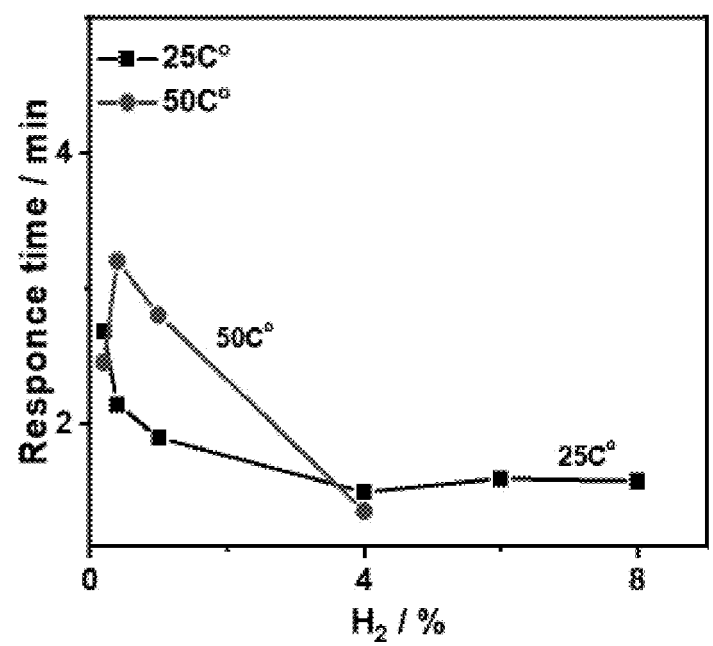
FIG. 17B is a graph showing the $H_2$ gas response time as a function of $H_2$ concentration at 25° C. and 50° C. on PdPt nanocages.

FIG. 17A shows the $H_2$ response defined as $\Delta I/I_{min}$ where $I_{min}$ is the minimum current of each step and $\Delta I$ is the step height. FIG. 17A shows that the response is increased when the $H_2$ concentration is increased from 0.1 v % to 8 v %. The maximum response is reached at 8 v % $H_2$ at 25° C. and 6 v % $H_2$ at 50° C. (FIG. 17A). $\Delta I/I_{min}$ $H_2$ response at 25° C. was significantly higher than that at 50° C. FIG. 17B shows the dependence of response times on the $H_2$ gas concentration. The response time decreases substantially with increasing $H_2$ concentration, with a minimum response time of 1.8 min at 8 v % $H_2$ at 25° C. and 1.3 min at 6 v % $H_2$ at 50° C. (FIG. 17B).

Figure 18A:
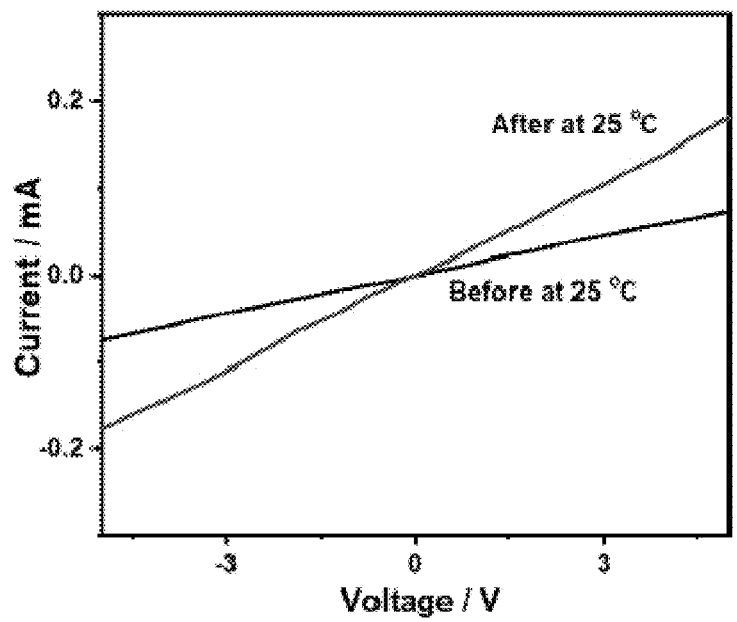
FIG. 18A shows the current-voltage I(V) measurements at 25° C. before and after the $H_2$ gas response on PdPt nanocages.
Figure 18B:
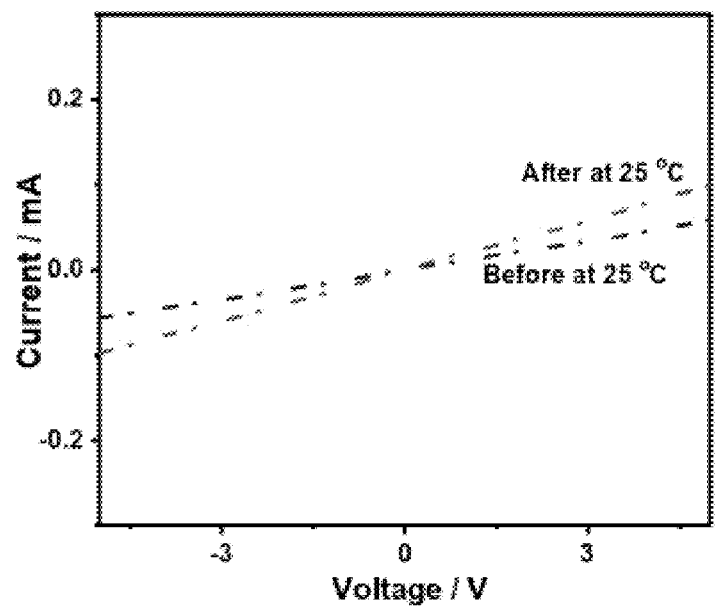
FIG. 18B shows the current-voltage I(V) measurements at 50° C. before and after the $H_2$ gas response on PdPt nanocages.
Figure 19:
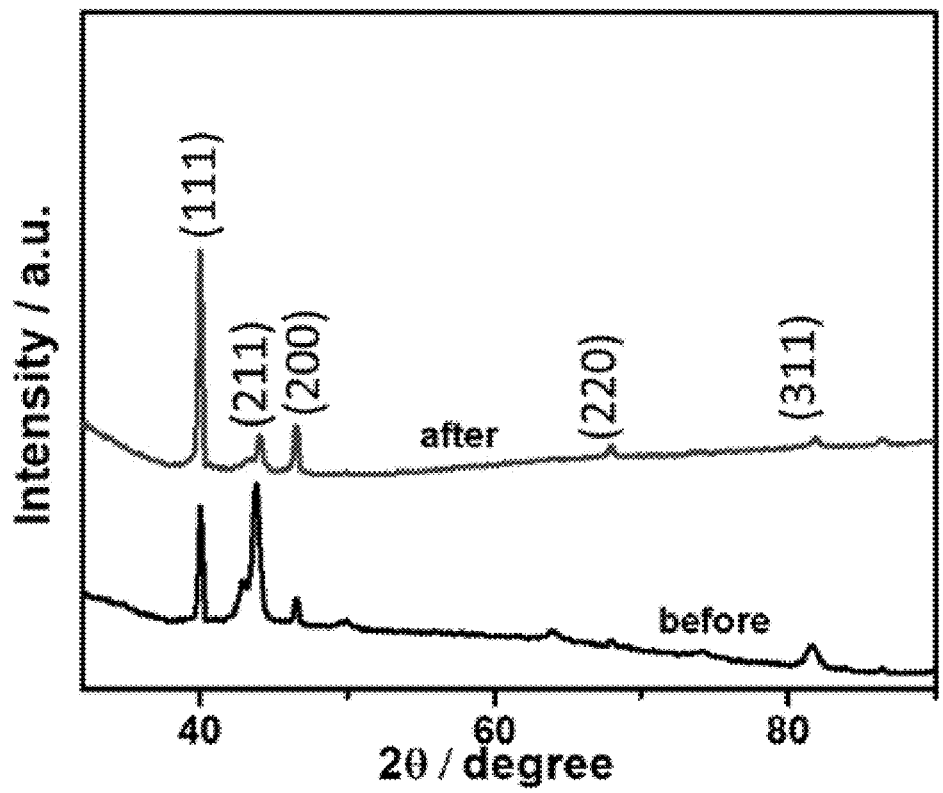
FIG. 19 is the XRD spectrum of the PdPt nanocages before and after the $H_2$ gas response at 50° C.
Figure 20A:
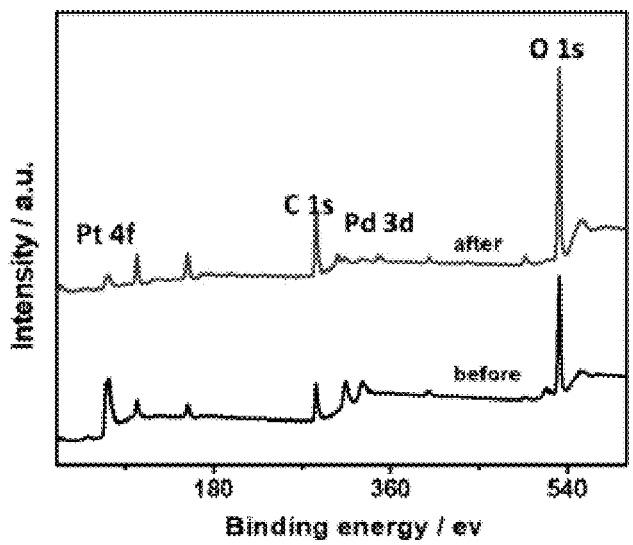
FIG. 20A is an XPS survey of the PdPt nanocages before and after the $H_2$ gas response at 50° C.
Figure 20B:
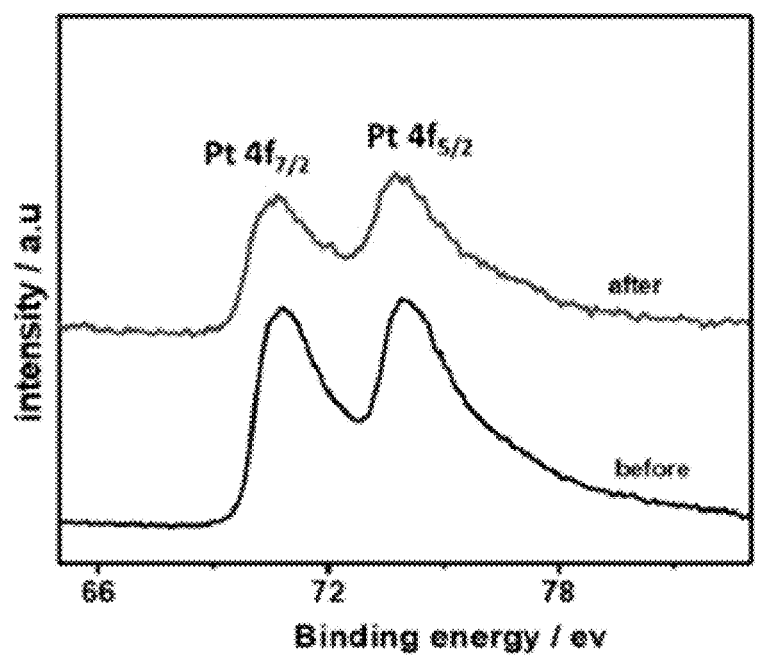
FIG. 20B is a high-resolution XPS spectrum of Pt of the PdPt nanocages before and after the $H_2$ gas response at 50° C.
Figure 20C:
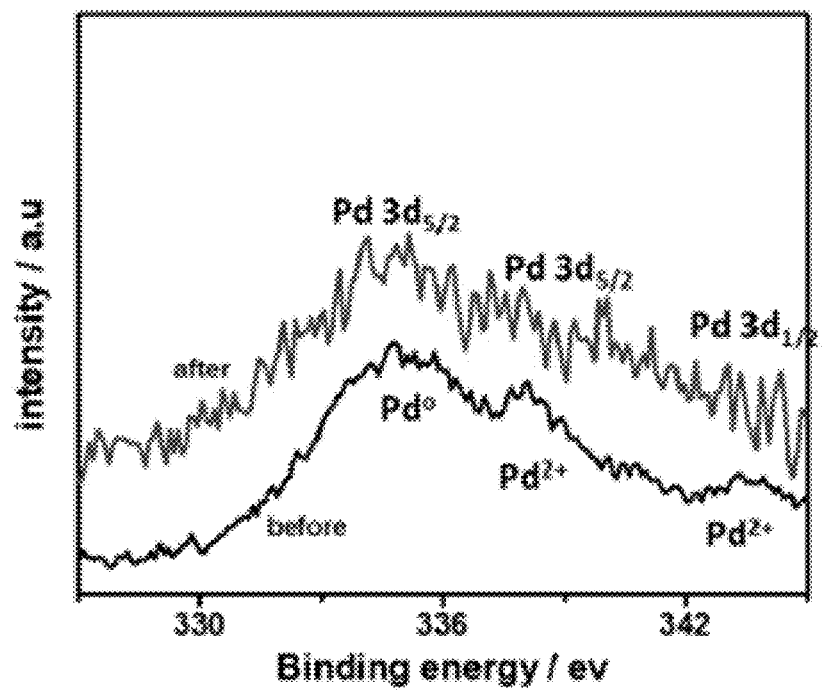
FIG. 20C is a high-resolution XPS spectrum of Pd of the PdPt nanocages before and after the $H_2$ gas response at 50° C.

FIG. 18A and FIG. 18B show the $H_2$ gas response using electrical charge transport I(V) measurements before and after $H_2$ detection at 25° C. and 50° C. The I(V) displayed a linear relationship at 25° C. (FIG. 18A) and at 50° C. (FIG. 18B). However, after $H_2$ detection, the I(V) kept its linear relationship behavior but increased by more than 2 times at 25° C. (FIG. 18A) and by 1.4 times at 50° C. (FIG. 18B) due to resistance decrease after exposure to $H_2$ gas. The XRD and XPS analysis were carried out for the PdPt nanocages after $H_2$ detection measurements at 50° C. The results showed that the PdPt nanocages maintained their fcc crystal structure with the same XRD diffraction patterns without any significant changes except for a slight broadening in the half-width of the peaks (FIG. 19). Meanwhile, the XPS surveys and high-resolution analysis also showed that the PdPt nanocages kept their electronic structure and surface composition without any significant change (FIG. 20A, FIG. 20B, and FIG. 20C). These results clearly indicate the absence of any kind of physical distortion for PdPt nanocages after $H_2$ detection even at a high $H_2$ concentration of 6 v %.

The $H_2$ detection performance of the Pd@PdPtPd yolk-shell and PdPt nanocages described herein are shown in Table 1. The sensors described herein exhibit high detection limits (up to 8 v % $H_2$) and fast response times. The sensitivity was measured at a concentration of 4 v % $H_2$ and calculated using the equation S (%)=(($R_g$−$R_a$))/$R_a$×100, where S is the sensitivity, $R_g$ is resistance under $H_2$, and $R_a$ is resistance under air. The response time was also measured at a concentration of 4 v % $H_2$.

TABLE 1

H₂ detection performance of Pd@PdPtPd yolk-shell and PdPt nanocages

| Sensor | Temperature (° C.) | Sensitivity (%) at 4 v % | Response time (sec) at 4 v % | Detection limit (%) |
|---|---|---|---|---|
| Pd@PtPd yolk-shell | RT | 135 | 130 | 0.2-8 |
|  | 50 | 35 | 150 |  |
| PtPd nanocages | RT | 225 | 120 | 0.2-8 |
|  | 50 | 100 | 48 |  |

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A porous $Pd_{nanocube}$@$PdPt_{nanodendrites}$ yolk-shell or hollow PdPt nanocage for $H_2$ detection wherein the $Pd_{nanocube}$@$PdPt_{nanodendrites}$ yolk-shell comprises a Pd nanocube core coated with a hierarchal porous layer and PdPt porous spatial nanodendrites wherein the dendrites comprise hyper-branched arms and wherein the hollow PdPt nanocage comprises a hollow core, a hierarchal porous layer, and PdPt porous nanodendrites.

2. The porous $Pd_{nanocube}$@$PdPt_{nanodendrites}$ yolk-shell of claim 1, wherein the $Pd_{nanocube}$@$PdPt_{nanodendrites}$ yolk-shell has a diameter of about 70 nm to 90 nm.

3. The porous $Pd_{nanocube}$@$PdPt_{nanodendrites}$ yolk-shell of claim 2, wherein the $Pd_{nanocube}$@$PdPt_{nanodendrites}$ yolk-shell has a diameter of 80 nm.

4. The porous $Pd_{nanocube}$@$PdPt_{nanodendrites}$ yolk-shell of claim 1, wherein the hyper-branched arms have an average thickness of about 20 nm to 40 nm.

5. The porous $Pd_{nanocube}$@$PdPt_{nanodendrites}$ yolk-shell of claim 4, wherein the hyper-branched arms have an average thickness of about 30 nm.

6. The hollow PdPt nanocage of claim 1, wherein the hollow PdPt nanocage has a diameter of about nm to 40 nm.

7. The hollow PdPt nanocage of claim 6, wherein the hollow PdPt nanocage has a diameter of about nm.

8. The porous $Pd_{nanocube}$@$PdPt_{nanodendrites}$ yolk-shell or hollow PdPt nanocage of claim 1, wherein the hierarchal porous layer is characterized by pores that are less than about 2 nm and pores that are greater than about 10 nm.

9. The porous $Pd_{nanocube}$@$PdPt_{nanodendrites}$ yolk-shell or hollow PdPt nanocage of claim 1, wherein the atomic ratio of Pd to Pt is about 1:1 to 3:2 as measured by Energy Dispersive Spectrometer elemental mapping.

10. The porous $Pd_{nanocube}$@$PdPt_{nanodendrites}$ yolk-shell or hollow PdPt nanocage of claim 1, wherein the surface atomic ratio of Pt and Pd as measured by X-ray Photoelectron Spectroscopy is between about 52:48 to 58:42.

11. The porous $Pd_{nanocube}$@$PdPt_{nanodendrites}$ yolk-shell or hollow PdPt nanocage of claim 1, wherein the $Pd_{nanocube}$@$PdPt_{nanodendrites}$ yolk-shell or PdPt nanocage detects $H_2$ at a concentration from about 0.05 v % to 12 v % in air, $N_2$, or a mixture of air and $N_2$ at a temperature between about 5-90° C. and exhibits a response time between about 90 seconds to 170 seconds.

12. The porous $Pd_{nanocube}$@$PdPt_{nanodendrites}$ yolk-shell or hollow PdPt nanocage of claim 11, wherein the concentration of $H_2$ is about 0.2 v % to 8 v %.

13. The porous $Pd_{nanocube}$@$PdPt_{nanodendrites}$ yolk-shell or hollow PdPt nanocage of claim 11, wherein the temperature is between about 25-50° C.

14. The porous $Pd_{nanocube}$@$PdPt_{nanodendrites}$ yolk-shell or hollow PdPt nanocage of claim 11, wherein the response time is between about 120 seconds and 150 seconds.

15. The porous $Pd_{nanocube}$@$PdPt_{nanodendrites}$ yolk-shell or hollow PdPt nanocage of claim 11, wherein the $H_2$ detection is carried out under an applied voltage of 0.1-2 V.

16. The porous $Pd_{nanocube}$@$PdPt_{nanodendrites}$ yolk-shell or hollow PdPt nanocage of claim 1, wherein the porous $Pd_{nanocube}$@$PdPt_{nanodendrites}$ yolk-shell or hollow PdPt nanocage are free-standing.

17. The porous $Pd_{nanocube}$@$PdPt_{nanodendrites}$ yolk-shell or hollow PdPt nanocage of claim 1, wherein the porous $Pd_{nanocube}$@$PdPt_{nanodendrites}$ yolk-shell or hollow PdPt nanocage are supported.

18. The porous $Pd_{nanocube}$@$PdPt_{nanodendrites}$ yolk-shell or hollow PdPt nanocage of claim 17, wherein the support is polymer-based support, carbon-based support, or a semiconductor.

19. A synthesis for the porous $Pd_{nanocube}$@$PdPt_{nanodendrites}$ yolk-shell of claim 1, comprising the following steps:
   (a) synthesis of a Pd nanocube;
   (b) coating of the Pd nanocube with a $SiO_2$ layer via silanization to afford $Pd_{nanocube}$@$SiO_2$;
   (c) formation of the PdPt nanodendrites via self-assembly to afford Pd@$SiO_2$@PdPt; and
   (d) etching of the $SiO_2$ layer to afford the $Pd_{nanocube}$@$PdPt_{nanodendrites}$ yolk-shell.

20. A synthesis for the hollow PdPt nanocage of claim 1, comprising the following steps:
   (a) synthesis of $SiO_2$ nanoparticles;
   (b) formation of the PdPt nanodendrites over the $SiO_2$ nanoparticles via self-assembly to afford $SiO_2$@PdPt; and
   (c) etching of the $SiO_2$ layer to afford the PdPt nanocages.

21. A porous $Pd_{nanocube}$@$PdPt_{nanodendrites}$ yolk-shell or hollow PdPt nanocage for CO or $H_2S$ detection wherein the $Pd_{nanocube}$@$PdPt_{nanodendrites}$ yolk-shell comprises a Pd nanocube core coated with a hierarchal porous layer and PdPt porous spatial nanodendrites wherein the dendrites comprise hyper-branched arms and wherein the hollow PdPt nanocage comprises a hollow core, a hierarchal porous layer, and PdPt porous nanodendrites.

* * * * *